United States Patent
Shad et al.

(10) Patent No.: US 9,247,435 B2
(45) Date of Patent: Jan. 26, 2016

(54) NULL BEAMFORMING IN A COMMUNICATION NETWORK

(71) Applicant: QUALCOMM Incorporated, San Diego, CA (US)

(72) Inventors: Faisal Mahmood Shad, Ocala, FL (US); Richard Joseph McConnell, Rancho Cucamonga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 14/156,294

(22) Filed: Jan. 15, 2014

(65) Prior Publication Data

US 2015/0201336 A1    Jul. 16, 2015

(51) Int. Cl.

| | |
|---|---|
| H04B 7/00 | (2006.01) |
| H04W 16/28 | (2009.01) |
| H04W 28/04 | (2009.01) |
| H04W 24/02 | (2009.01) |
| H04B 7/06 | (2006.01) |
| H04B 7/08 | (2006.01) |
| H04L 1/00 | (2006.01) |

(Continued)

(52) U.S. Cl.
CPC ............. *H04W 16/28* (2013.01); *H04B 7/0617* (2013.01); *H04B 7/086* (2013.01); *H04L 1/0026* (2013.01); *H04L 1/0027* (2013.01); *H04L 1/0073* (2013.01); *H04L 25/03955* (2013.01); *H04W 24/02* (2013.01); *H04W 28/048* (2013.01); *H01Q 3/2611* (2013.01)

(58) Field of Classification Search
CPC ....... H04B 3/54; H04B 7/0413; H04B 7/0617

USPC ........... 455/63.4, 562.1, 575.7, 39, 103, 270, 455/271, 272
See application file for complete search history.

(56) References Cited

U.S. PATENT DOCUMENTS 6,032,028 A    2/2000  Dickey et al.
8,630,267 B1   1/2014  Jin
(Continued)

FOREIGN PATENT DOCUMENTS

WO    2005039070    4/2005
WO    2013118127    8/2013

OTHER PUBLICATIONS

Sharan, Vatsal et al., "Localization of Acoustic Beacons using Iterative Null Beamforming over Ad-hoc Wireless Sensor Networks", 5 pages.

(Continued)

*Primary Examiner* — Tuan Pham
(74) *Attorney, Agent, or Firm* — DeLizio Law, PLLC

(57) ABSTRACT

A first network device can implement null beamforming functionality to generate a NULL at a receive port of a second network device. In one embodiment, the first network device can estimate beamforming parameters to be used for transmitting the data signal to a first receive port of the second network device and for generating a null signal at a second receive port of the second network device, so that the second network device does not receive the data signal at the second receive port. In another embodiment, the first network device can estimate beamforming parameters to be used for transmitting the data signal to a receive port of the second network device and for generating a null signal at a receive port of a third network device, so that the receive port of the third network device does not receive the data signal.

30 Claims, 11 Drawing Sheets

(51) Int. Cl.
  *H04L 25/03* (2006.01)
  *H01Q 3/26* (2006.01)

(56) References Cited

U.S. PATENT DOCUMENTS

| | | | | |
|---|---|---|---|---|
| 8,964,819 B2 * | 2/2015 | Earnshaw | ................ | H04B 3/32 375/219 |
| 2007/0129111 A1 | 6/2007 | Kim et al. | | |
| 2010/0091892 A1 | 4/2010 | Gorokhov | | |
| 2010/0119004 A1 | 5/2010 | Hadad | | |
| 2013/0007311 A1 * | 1/2013 | Abad Molina | ........ | H04W 36/14 710/29 |
| 2013/0107974 A1 * | 5/2013 | Schwager | ................ | H04B 3/50 375/257 |
| 2013/0182785 A1 | 7/2013 | Koifman et al. | | |
| 2013/0315286 A1 | 11/2013 | Shad et al. | | |

OTHER PUBLICATIONS

"PCT Application No. PCT/US2015/011510 International Search Report", Mar. 27, 2015, 9 pages.

* cited by examiner

NULL BEAMFORMING IN A COMMUNICATION NETWORK

BACKGROUND

Embodiments of the inventive subject matter generally relate to the field of communication networks and more particularly, to null beamforming in a communication network.

Electric transmission and distribution lines are typically used for providing electric power from generators to buildings, residences, and other components of a city's infrastructure. The electric power may be transmitted over the transmission lines at a high voltage, and may be distributed to buildings and other structures at much lower voltages using electric power lines. Besides providing electric power, electric power lines can also be used to implement powerline communications in both indoor and outdoor environments. Powerline communications can provide another communication medium for connecting various network nodes together in local and wide area networks. In a multiple-input multiple-output (MIMO) powerline communication (PLC) network, beamforming parameters may be used to compensate for channel variations and noise. The beamforming parameters are typically optimized for maximizing the communication link capacity or signal-to-noise ratio (SNR).

SUMMARY

Various embodiments for null beamforming in a communication network are disclosed. In some embodiments, a first network device determines to transmit a data signal from a first transmit port and a second transmit port of the first network device to a first receive port of a second network device. The first network device determines beamforming parameters for transmitting the data signal to the first receive port of the second network device and for generating a null signal at a second receive port of the second network device to cause the second network device to receive the data signal at the first receive port and to not receive the data signal at the second receive port.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to null beamforming in a powerline communication network (e.g., a network that implements HomePlug® AV/AV2 protocols, HomePlug GreenPHY protocols, ITU-T G.hn protocols, etc.), embodiments are not so limited. In other embodiments, operations for null beamforming may be implemented in communication networks that implement other suitable wired communication protocols (e.g., Ethernet, multimedia over coax alliance (MoCA), etc.) or wireless communication protocols (e.g., wireless local area network protocols, such as IEEE 802.11 protocols). In other instances, well-known instruction instances, protocols, structures, and techniques have not been shown in detail in order not to obfuscate the description.

In a MIMO PLC system, a data signal transmitted from a transmitting PLC device may be received at each receive port of each PLC device that is within a communication range of the transmitting PLC device. In the MIMO PLC system, the transmitting PLC device may estimate beamforming parameters to maximize the transmission capacity of each unicast communication link between the transmitting and the receiving PLC devices or to maximize the signal strength of a signal received at the receiving PLC device. For example, the transmitting PLC device may use spot beamforming operations to select beamforming parameters that maximize the transmission capacity. As another example, the transmitting PLC device may use eigen-beamforming operations to select beamforming parameters that maximize communication performance with the intended receiving PLC device. However, with the existing beamforming operations, the transmitted data signals may be received at each receive port of each receiving PLC device.

Figure 9:
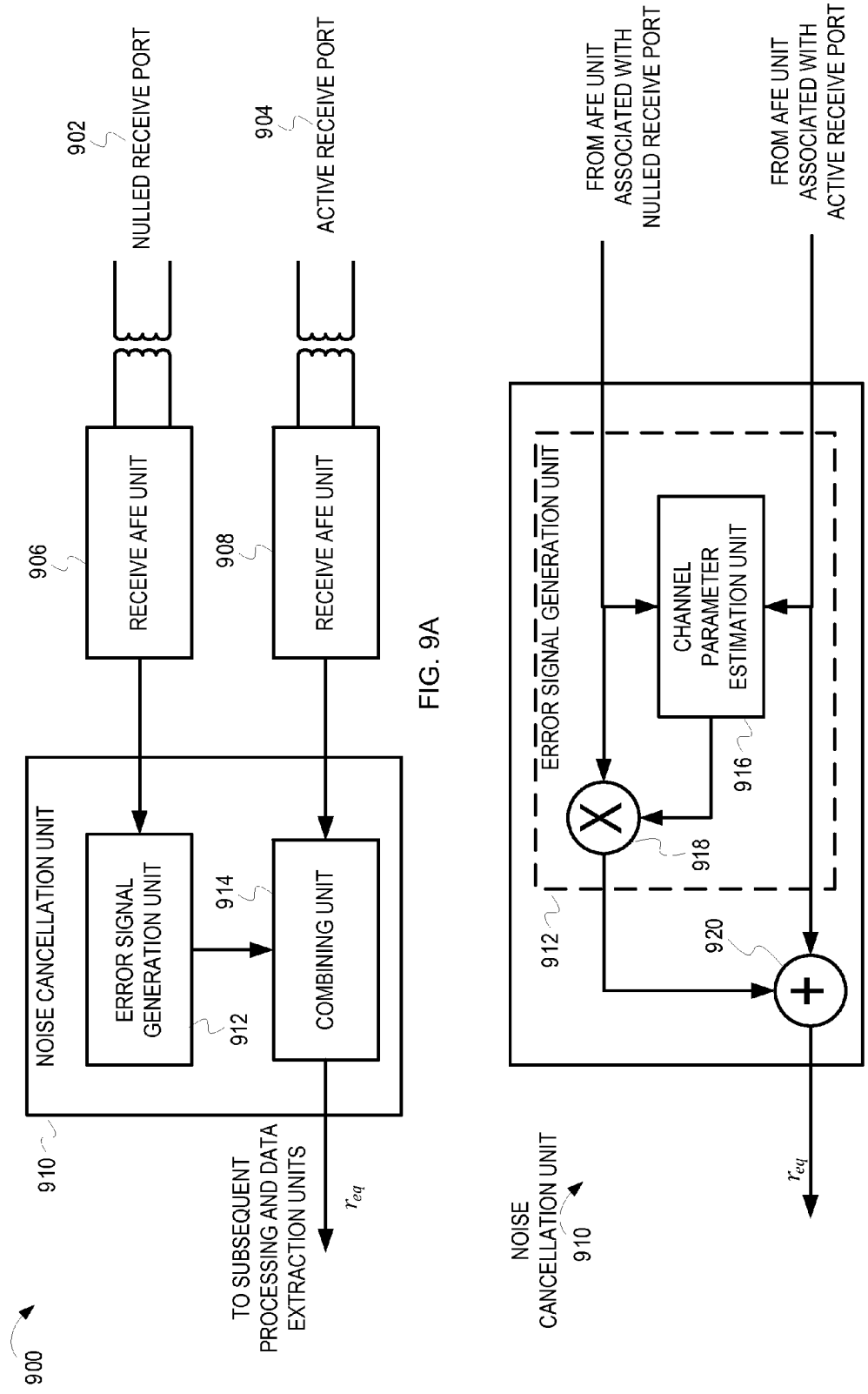
FIG. 9A is a block diagram illustrating an example mechanism for correlated noise cancellation at a receiving network device.
FIG. 9B is example block diagram of a noise cancellation unit.

In some embodiments, a network device can be configured to generate beamforming parameters to pre-condition a data signal transmitted from multiple transmit ports, such that a first receive port of a receiving network device receives a data signal but a second receive port of the receiving network device does not receive the data signal. This process for determining beamforming parameters so that the receiving network device does not receive the data signal at one of the receive ports is hereinafter referred to as a process for generating a NULL at a receive port or "null beamforming." In some embodiments, a transmitting network device can generate beamforming parameters so that a data signal is received at a receive port of a first receiving network device but the data signal is not received at a receive port of a second receiving network device. In some embodiments, multiple transmitting network devices may each use the null beamforming operations to concurrently transmit independent data signals to a common receiving network device, as will be further described with reference to FIG. 4. In some embodiments, a transmitting network device may use null beamforming operations to concurrently transmit independent data signals to multiple receiving network devices, as will be further described with reference to FIGS. 5, 6A, and 6B. In some embodiments, a receiving network device may sample a noise signal received at a nulled receive port to actively cancel noise and interference in a data signal received at an active receive port of the network device, as will be further described with reference to FIGS. 9A, 9B, and 10. Such a mechanism for null beamforming can allow a transmitting network device to direct a data signal to a receive port of a first receiving network device and can prevent a second receiving network device from receiving the data signal at a particular receive port. The null beamforming operations can also minimize the probability of interference and collisions between data signals transmitted from different transmitting network devices to different ports of a common receiving network device. As will be further described below, the null beamforming operations can be used for simultaneous signal transmission, simultaneous signal reception, simultaneous communication using multiple communication protocols, congestion mitigation, and noise and interference cancellation.

Figure 1:
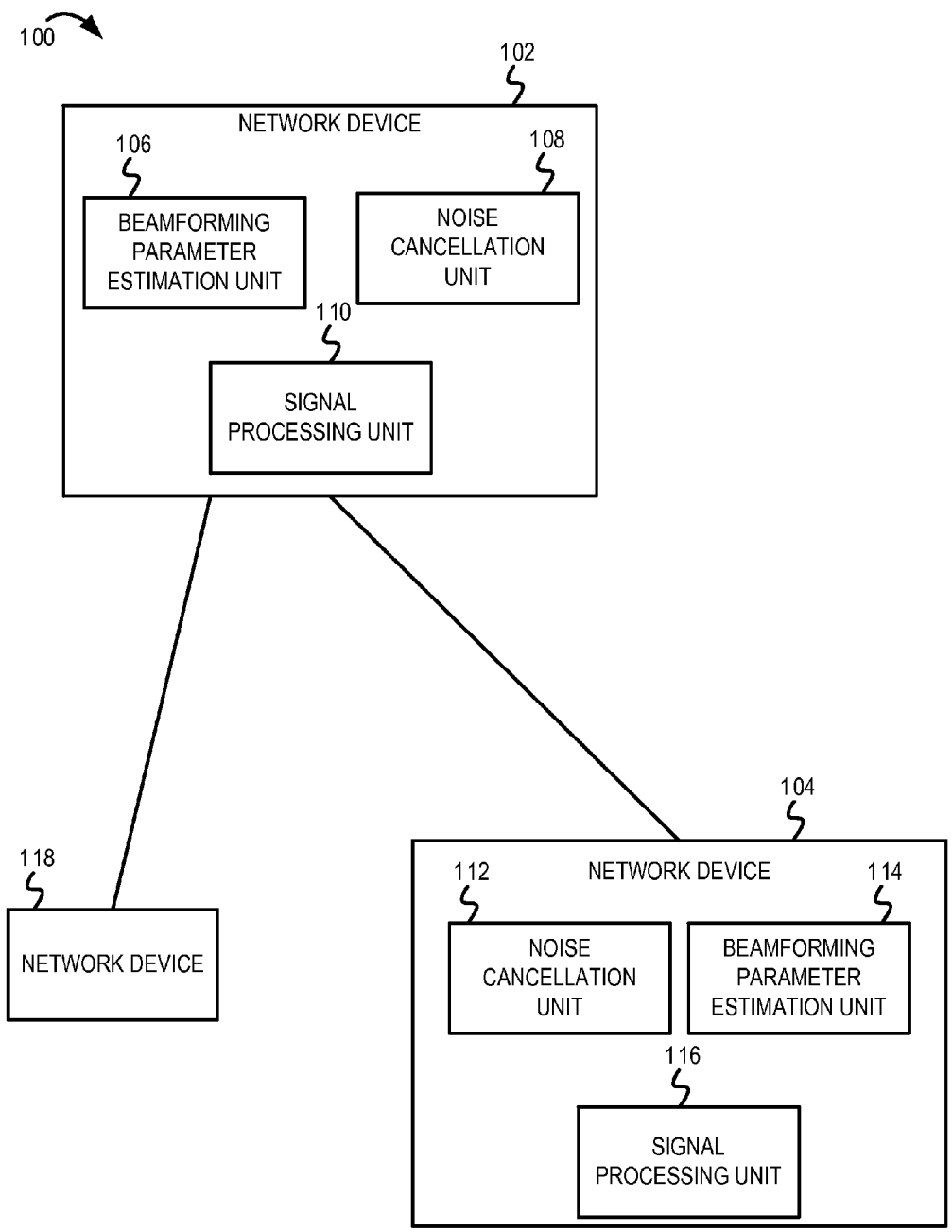
FIG. 1 is an example block diagram including a mechanism for null beamforming in a communication network.

FIG. 1 is an example block diagram including a mechanism for null beamforming in a communication network 100. The communication network 100 includes network devices 102, 104, and 118. The network device 102 includes a beamforming parameter estimation unit 106, a noise cancellation unit 108, and a signal processing unit 110. The network device 104 includes a noise cancellation unit 112, a beamforming parameter estimation unit 114, and a signal processing unit 116. In some embodiments, the network devices 102 and/or 104 may not include some of the components depicted in FIG. 1. Although not depicted in FIG. 1, the network device 118 may also include a noise cancellation unit, a beamforming parameter estimation unit, and/or a signal processing unit.

In one example, the communication network 100 may be a HomePlug AV Logical Network (AVLN). Within the communication network 100, the network devices 102, 104, and 118 may support any suitable network topology, such as a mesh topology, tree topology, star topology, bus topology, etc. In some implementations, the network devices 102, 104, and 118 can be electronic devices in an outdoor PLC environment. For example, the outdoor PLC environment can be a smart power grid. In this example, the network devices 102, 104, and 118 can be dedicated PLC devices or PLC-capable electronic devices configured to operate in the outdoor environment, such as power meters, electric vehicle charging stations, power generators, electric power distribution devices, etc. In some implementations, the network devices 102, 104, and 118 may be PLC-capable electronic devices in an indoor environment (e.g., a home network). In this implementation, the network devices 102, 104, and 118 may be PLC-capable electronic devices such as laptop computers, tablet computers, televisions, television set-top boxes (or set-top units), smart appliances, gaming consoles, access points, or other suitable electronic devices. In some implementations, the network devices 102, 104, and 118 may be PLC-capable electronic devices that can be located in the indoor PLC environment or in the outdoor PLC environment. In some embodiments, the network devices 102, 104, and 118 can be configured to communicate using HomePlug AV/AV2 communication protocols, HomePlug GreenPHY communication protocols, G.hn communication protocols, or other suitable PLC protocols. In some embodiments, in addition to PLC protocols, the network devices 102, 104, and 118 may implement other wired or wireless communication protocols (e.g., Bluetooth®, WiMAX, Ethernet, MoCA, WLAN (e.g., IEEE 802.11 protocols), etc.). Furthermore, in some embodiments, the network devices 102, 104, and 118 may each include radio transceivers, analog front end (AFE) units, processors, memory, and/or logic to implement the communication protocols and related functionality.

A powerline network may be formed using a line (L) wire, a neutral (N) wire, and a protective earth (PE) wire. For powerline communication, the network devices 102, 104, and 118 may use a pair of the line, neutral, and protective earth wires to transmit and receive messages across the powerline network. Each of the network devices 102, 104, and 118 may include line, neutral, and protective earth terminals for transmitting or receiving PLC signals via the powerline network. A pair of wires over which a PLC signal is differentially transmitted or received in the powerline network may be referred to as a PLC channel. A pair of terminals from which a PLC signal is differentially transmitted on a PLC channel may be referred to as a transmit port (or a transmit network interface). A pair of terminals from which a PLC signal is differentially received via the PLC channel may be referred to as a receive port (or a receive network interface). In some embodiments, the network devices 102 and 104 may implement single-input single-output (SISO) communication by exchanging PLC signals to/from a single port (e.g., an L-N port) over a single communication channel. In other embodiments, the network devices 102 and 104 may implement multiple-input multiple-output (MIMO) communication by exchanging PLC signals to/from two or more ports and over two or more communication channels. For example, a MIMO PLC system may include two transmit ports (e.g., an L-N port and an L-PE port) and four receive ports (e.g., an L-N port, an L-PE port, an N-PE port, and common mode). A common mode signal may be a portion of the transmitted PLC signal that may be received at a receiving PLC device. The receiving PLC device may provide one return path by providing a low-capacitance path to ground (e.g., by using a large ground plane at the receiving PLC device). For convenience, subsequent operations of the transmitting PLC device and the receiving PLC device will be described for a MIMO PLC system with two transmit ports and two receive ports (i.e., 2×2 MIMO PLC system). However, the operations described herein can be extended to MIMO PLC systems that include other suitable number of transmit ports and receive ports (e.g., a 2×3 MIMO PLC system, a 2×4 MIMO PLC system, etc.). In some embodiments, the network devices 102 and 104 may use orthogonal frequency division multiplexing (OFDM) protocols to communicate via the powerline network. In accordance with the OFDM protocols, the network device 102 may simultaneously transmit data over multiple orthogonal carrier signals (also referred to as "communication sub-carriers").

In one implementation, the network device 102 may determine to transmit a data signal to a first receive port of the network device 104. The beamforming parameter estimation unit 106 may estimate the beamforming parameters that allow the network device 102 to transmit the data signal to the first receive port of the network device 104 and generate a NULL at a second receive port of the network device 104. The signal processing unit 110 may apply the beamforming parameters to the data signal and transmit the resultant signal to the network device 104. In one example, the beamforming parameter estimation unit 106 may estimate the beamforming parameters for transmitting data signals from multiple transmit ports of the network device 102. The signal processing unit 110 may apply the beamforming parameters to a data signal that is to be transmitted from a suitable number of transmit ports of the network device 102. The network device 104 may receive the data signal at the first receive port and may not receive the data signal at the second receive port. In other words, by applying the beamforming parameters to the data signal, the network device 102 may generate a NULL at the second receive port of the network device 104. The data signal received at the first receive port may be a function of the data signal transmitted by the network device 102. The signal processing unit 116 may apply a suitable corrector factor (e.g., execute equalization operations) to extract the data signal originally transmitted by the network device 102. Additionally, in some embodiments, the noise cancellation unit 112 may implement functionality for actively cancelling correlated noise and interference in response to receiving the data signal at the first receive port and detecting the NULL at the second receive port. In some embodiments, the signal received at the second receive port subject to the null beamforming ("nulled receive port") may not include any data but may include noise and interference from the communication network. Therefore, the noise cancellation unit 112 may use the noise signal which is sampled at the nulled receive port for cancelling noise and interference detected at the first receive port. Additionally, in some embodiments, the beamforming parameter estimation unit 106 may estimate the beamforming parameters to allow the network device 102 to transmit the data signal to a receive port of the network device 104 and to generate a NULL at a receive port of a different network device (e.g., the network device 118), as will be further described in FIGS. 4-7. It is noted that although not described above, the noise cancellation unit 110 of the network device 102 and the beamforming parameter estimation unit 114 of the network device 104 may be configured to execute similar operations as described above with reference to the network devices 104 and 102, respectively.

Figure 2A:
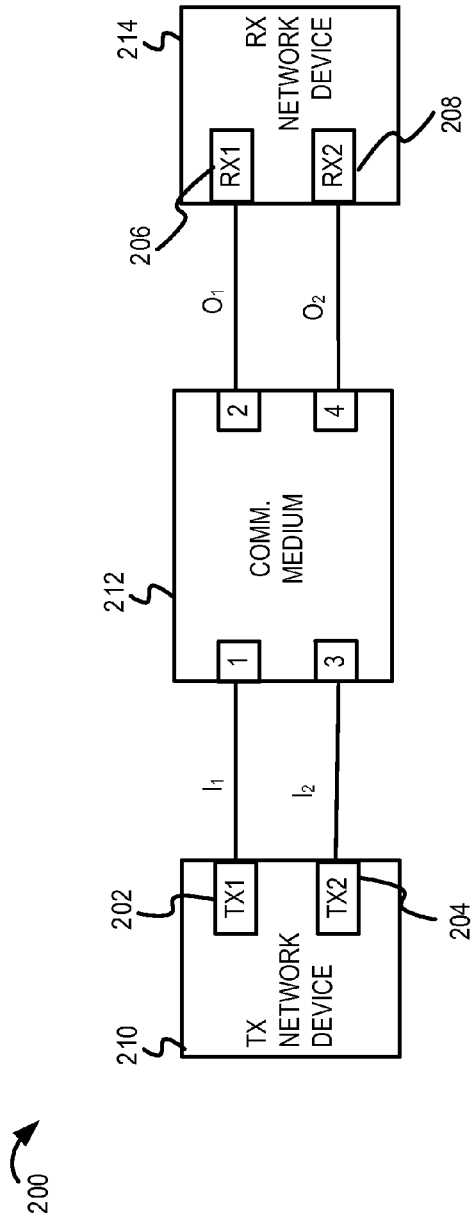
FIG. 2A is an example communication system including a communication medium that couples a two-port transmitting network device and a two-port receiving network device.

The communication medium between a transmitting network device and a receiving network device may be represented as a multi-port network device or a "black box" with multiple input ports and multiple output ports. FIG. 2A depicts a communication system 200 including a communication medium 212 that couples a two-port transmitting network device 210 and a two-port receiving network device 214. The communication medium 212 may include multiple communication channels between the transmitting network device 210 and the receiving network device 214. The number of communication channels between the transmitting network device 210 and the receiving network device 214 may depend on the number of transmit ports that will be used by the transmitting network device 210, the number of electrical wires used by the communication medium, and the number of receive ports that will be used by the receiving network device 214. For example, if the communication medium 212 is a MIMO PLC medium, the MIMO PLC medium may include an L-N communication channel, an L-PE communication channel, and/or other suitable PLC channels between the transmitting and receiving PLC devices. The transmitting network device 210 is associated with transmit ports 202 and 204 (depicted as TX1 and TX2, respectively). The receiving network device 214 is associated with receive ports 206 and 208 (depicted as RX1 and RX2, respectively). In FIG. 2A, the transmit ports 202 and 204 are designated as input ports 1 and 3, respectively, of the communication medium 212. The receive ports 206 and 208 are designated as output ports 2 and 4, respectively, of the communication medium 212. The transmitting network device 210 transmits signals $I_1$ and $I_2$ from the transmit ports 202 and 204, respectively. The input signals $I_1$ and $I_2$ are affected by the characteristics and behavior of the communication medium 212, as will be further described below. At the output of the communication medium 212, output signals $O_1$ and $O_2$ are provided to the receive ports 206 and 208, respectively. The output signals $O_1$ and $O_2$ may be mathematically represented by Eqs. 1a and 1b.

$$O_1 = S_{21}*I_1 + S_{23}*I_2 \qquad \text{Eq. 1a}$$

$$O_2 = S_{41}*I_1 + S_{43}*I_2 \qquad \text{Eq. 1b}$$

In the above equations, $S_{ij}$ represents the scattering parameters associated with the communication medium 212 (also referred to as "S-parameters" or "transmission parameters") from the $j^{th}$ input port to the $i^{th}$ output port. The S-parameters also represent the characteristics of the communication channels of the communication medium from the transmit ports to the receive ports. The S-parameters may be a complex valued linear multiplier affecting both the phase and the amplitude of the signal which is transmitted from the $j^{th}$ input port to the $i^{th}$ output port via the communication medium 212. The S-parameters typically depend on the frequency of the communication sub-carriers on which the transmitting network device 210 and the receiving PLC device 214 operate. The communication sub-carriers on which the transmitting network device 210 and the receiving PLC device 214 operate may be predefined based on the communication protocols (e.g., HomePlug AV protocols, IEEE 1901 protocols, etc.) implemented by the transmitting network device 210 and the receiving PLC device 214.

To generate a NULL at a receive port of the receiving PLC device 214, the transmitting network device 210 can precondition the input signals $I_1$ and $I_2$ so that the receiving network device 214 receives a NULL signal at one of the receive ports and receives a function of the input signal at the other receive port. Referring to the example of FIG. 2A, the transmitting network device 210 (e.g., the beamforming parameter estimation unit) can estimate the beamforming parameters to apply to the input signals $I_1$ and $I_2$ so that the output signal $O_1$ is zero and the output signal $O_2$ includes the input signal $I_2$. By setting $O_1=0$ in Eq. 1a, the input signal $I_1$ can be represented in terms of the input signal $I_2$ as depicted in Eq. 2.

$$I_1 = \left(-\frac{S_{23}}{S_{21}}\right)*I_2 \qquad \text{Eq. 2}$$

Substituting Eq. 2 into Eq. 1b yields Eq. 3. Eq. 3 represents the output signal received at the receive port ("active receive port") that receives the data signal from the transmitting network device 210.

$$O_2 = \left(S_{43} - \frac{S_{23}*S_{41}}{S_{21}}\right)*I_2 \qquad \text{Eq. 3}$$

Figure 2C:
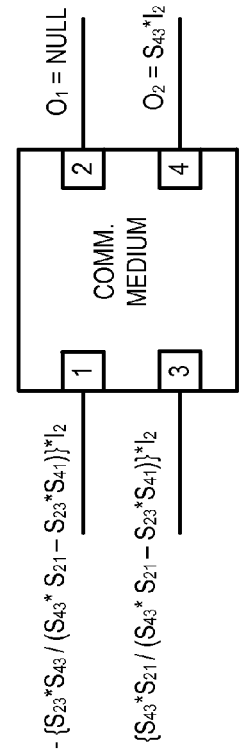
FIG. 2C is an example conceptual diagram including another embodiment for estimating beamforming parameters to generate a NULL at a receive port.
Figure 2B:
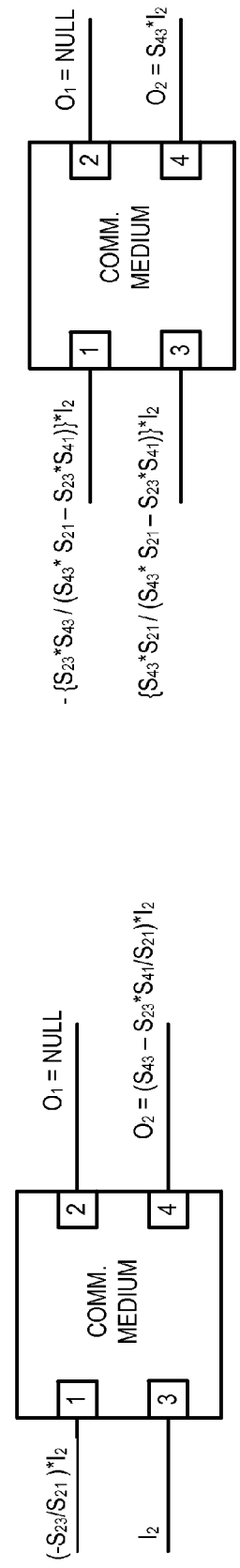
FIG. 2B is an example conceptual diagram including one embodiment for estimating beamforming parameters to generate a NULL at a receive port.

Accordingly, as depicted in FIG. 2B, the transmitting network device 210 can transmit the input signal $I_2$ to input port 204. The transmitting network device 210 (e.g., the signal processing unit) can also apply beamforming parameter $$\left(-\frac{S_{23}}{S_{21}}\right) \quad \text{Eq. 5}$$

to the input signal $I_2$ and transmit the resultant input signal via transmit port 202. As depicted in FIG. 2B, the receiving network device 214 does not receive any signal at the receive port 206 (e.g., $O_1$=NULL) and receives output signal $O_2$ at the receive port 208, in accordance with Eq. 3. The output signal $O_2$ received at the receiving network device 214 is a function of the S-parameters of the MIMO communication medium 212 between the transmitting network device 210 and the receiving network device 214. The receiving network device 214 (e.g., the signal processing unit) can apply a suitable correction factor (e.g., the inverse of beamforming parameter $$\left(S_{43} - \frac{S_{23} * S_{41}}{S_{21}}\right)$$

in accordance with Eq. 3) to retrieve the signal $I_2$ generated by the transmitting network device 210.

In the example of FIG. 2B, the transmitting network device 210 pre-processes the input signals before transmission to generate a NULL at a receive port 206 of the receiving network device 214. Likewise, the receiving network device 214 processes the received signal to extract the input signal originally generated by the transmitting network device 210. In other embodiments, however, some or all the processing operations of the receiving network device 214 may be off-loaded to the transmitting network device 210. In other words, the transmitting network device 210 may pre-condition the input signals to simplify the equalization (or decoding) operations executed on the data received at the active receive port 208 for extracting the input signal originally generated by the transmitting network device 210, as will be further described with reference to FIG. 2C. The transmitting network device 210 can pre-condition the input signals so that the receiving PLC device 214 does not receive any signal at receive port 206 (e.g., $O_1$=0) and the originally transmitted signal $I_2$ can be extracted from the output signal $O_2$ at receive port 208 with minimal processing. In the example of FIG. 2C, the transmitting network device 210 (e.g., the beamforming parameter estimation unit) can estimate beamforming parameters so that the receiving network device 214 receives a NULL signal at the receive port 206 and a combination of a single S-parameter and the input signal at the other receive port 208. In other words, transmitting network device 210 can estimate the beamforming parameters to be applied to the input signals $I_1$ and $I_2$ so that the receiving network device 214 receives $O_1$=0 and $O_2$=$S_{43}$*$I_2$. Mathematically, the operations for estimating the beamforming parameters to yield output signals $O_1$=0 and $O_2$=$S_{43}$*$I_2$ can be described with reference to Eqs. 4-8b. As will be further described below, the receiving PLC device 214 (e.g., the signal processing unit) may divide the received signal $O_2$ by the S-parameter $S_{43}$ to recover the originally transmitted signal $I_2$, thus minimizing the number of computations performed at the receiving network device 214.

The transmitting network device 210 pre-conditions input signal $I_2$ to yield modified input signal $I'_2$, represented by Eq. 4. To ensure that the active receive port 208 receives an output signal that is represented by Eq. 5, Eq. 5 is substituted into Eq. 4 to yield Eq. 6.

$$O_2 = \left(S_{43} - \frac{S_{23} * S_{41}}{S_{21}}\right) * I'_2 \quad \text{Eq. 4}$$

$$O_2 = S_{43} * I_2 \quad \text{Eq. 5}$$

$$S_{41} * \left(-\frac{S_{23}}{S_{21}}\right) * I'_2 + S_{43} * I'_2 = S_{43} * I_2 \quad \text{Eq. 6}$$

The transmitting network device 210 can solve Eq. 6 to yield the beamforming parameter that should be applied to the input signal $I_2$ for transmission from the transmit port 204, as depicted in Eq. 7. Likewise, Eq. 2 and Eq. 6 can be combined to yield the beamforming parameter that should be applied to the input signal $I_1$ for transmission the transmit port 202, as depicted in Eq. 8a. The resultant MIMO communication system including the pre-conditioned input signals and the resultant output signals is depicted in FIG. 2C.

$$I'_2 = \frac{S_{43} * S_{21}}{S_{43} * S_{21} - S_{23} * S_{41}} * I_2 \quad \text{Eq. 7}$$

Thus, the beamformed data signals transmitted from the transmit ports 202 and 204 of the transmitting network device 210 are represented by Eqs. 8a and 8b and illustrated in FIG. 2C.

Data signal from first transmit port 202: Eq. 8a $$\frac{-S_{43} * S_{23}}{S_{43} * S_{21} - S_{23} * S_{41}} * I_2$$

Data signal from second transmit port 204: Eq. 8b $$\frac{S_{43} * S_{21}}{S_{43} * S_{21} - S_{23} * S_{41}} * I_2$$

Offloading most of the processing operations to the transmitting network device 210 as described above with reference to Eqs. 4-8b can simplify the equalization operations at the receiving network device 214. In this embodiment, the receiving network device 214 (e.g., the signal processing unit) may extract the information from the received signal $O_2$ at receive port 208 by dividing the received signal by $S_{43}$ (e.g., multiplying the received signal $O_2$ by the reciprocal of $S_{43}$). Effectively, from the perspective of the receiving network device 214, the equalization (or decoding) operations are the same as the equalization operations that would be executed in a SISO system. In other words, the transmitting network device 210 may execute operations described with reference to FIG. 2C to transmit data signals to a receiving network device that operates in accordance with legacy SISO receiver digital signal processing procedures.

As described above, the transmitting network device 210 may employ various techniques to estimate the beamforming parameters for generating a NULL at a receive port of the receiving network device 214. Accordingly, to accurately decode the data signal received at the active receive port 208, the receiving network device 214 may have a priori knowledge of the beamforming parameter estimation technique employed at the transmitting network device 210. In some embodiments, the transmitting network device 210 may be pre-configured to use a particular beamforming parameter estimation technique and the receiving network device 214 may be pre-configured to use the corresponding decoding technique. In another embodiment, the transmitting network device 210 and the receiving network device 214 may exchange messages to negotiate the beamforming parameter estimation technique and the decoding technique based, at least in part, on processing capabilities of the receiving network device 214. For example, the transmitting and the receiving network devices may use the mechanism described in FIG. 2C if the receiving network device 214 has limited processing capabilities or a high processing load. In another embodiment, the receiving network device 214 may notify the transmitting network device 210 of the decoding technique (e.g., receive equalization technique) that will be employed, so that the transmitting network device 210 can use the corresponding beamforming parameter estimation technique. In another embodiment, the transmitting network device 210 may notify the receiving network device 214 of the beamforming parameter estimation technique that will be employed, so that the receiving network device 214 can use the corresponding decoding technique.

In some embodiments, the active receive port 208 and the nulled receive port 206 may be predetermined for each combination of transmitting network device 210 and receiving network device 214. In other embodiments, the transmitting network device 210 and the receiving network device 214 may exchange messages to select the ports on which the network devices 210 and 214 will transmit and receive communications. The selected receive port of the receiving network device 214 may be designated as the active receive port. The transmitting network device 210 may generate a NULL at the other receive port of the receiving network device 214. In another embodiment, the receiving network device 214 may select an active receive port for receiving communications from the transmitting network device 210 based, at least in part, on messages (e.g., communication link set-up messages) received from the transmitting network device 210. For example, the receiving network device 214 may receive communication link set-up messages and determine a performance measurement associated with each of the receive ports. With reference to the example of FIG. 2A, the receiving network device 214 may estimate the signal-to-noise ratio (SNR), attenuation, error rate, and/or other suitable performance measurement associated with the communication link set-up message received at ports 206 and 208. In one example, the receiving network device 214 may determine that the receive port 208 is associated with a preferred performance measurement (e.g., highest SNR). The receiving network device 214 may designate the receive port 208 as the active receive port for communicating with the transmitting network device 210 and provide a corresponding notification to the transmitting network device 210. The transmitting network device 210 may estimate beamforming parameters to transmit subsequent data signals to the active receive port 208 and to generate a NULL at the receive port 206.

In some embodiments, the transmitting network device 210 may be a PLC device that includes two transmit paths and generates two data streams from input data bits for transmission via two transmit ports (e.g., an L-N transmit port and an L-PE transmit port). In other embodiments, however, the transmitting network device 210 may include any suitable number of transmit paths, generate any suitable number of data streams, and consequently transmit the data streams from any suitable number of transmit ports (e.g., an L-N transmit port, an L-PE transmit port, and an N-PE transmit port). Furthermore, although examples describe the transmitting network device 210 generating a NULL at the receive port 206 (e.g., $O_1=0$), embodiments are not so limited. In other embodiments, the transmitting network device 210 may execute similar operations, as described above, to generate the NULL at the receive port 208 (e.g., $O_2=0$).

In some embodiments, the beamforming parameter estimation unit may estimate the beamforming parameters (see Eqs. 1a-8b) for each communication sub-carrier on which the transmitting network device 210 and the receiving network device 214 are configured to operate. In one embodiment, the communication sub-carriers may be predefined based on the communication protocol that is being implemented by the transmitting network device 210 and the receiving network device 214. In another embodiment, the transmitting network device 210 and the receiving network device 214 may exchange messages to select a subset of communication sub-carriers on which to exchange subsequent messages. The transmitting network device 210 may then estimate the beamforming parameters for the selected subset of communication sub-carriers. In some embodiments, some of the communication sub-carriers may be grouped and the operations for estimating the beamforming parameters may be executed for each group of communication sub-carriers.

In some embodiments, the network device 210 may transmit a data signal to a network device that implements multiple communication protocols. For example, the receive port 206 of the network device 214 may implement a first communication protocol (e.g., HomePlug AV protocol), while the receive port 208 of the network device 214 may implement a second communication protocol (e.g., ITU-T G.hn protocol). To transmit a data signal using the first communication protocol, the network device 210 may estimate beamforming parameters to transmit the data signal to the receive port 206, while generating a NULL at the receive port 208 (associated with the second communication protocol). Alternatively, to transmit a data signal using the second communication protocol, the network device 210 may estimate beamforming parameters to transmit the data signal to the receive port 208, while generating a NULL at the receive port 206 (associated with the first communication protocol).

Figure 3:
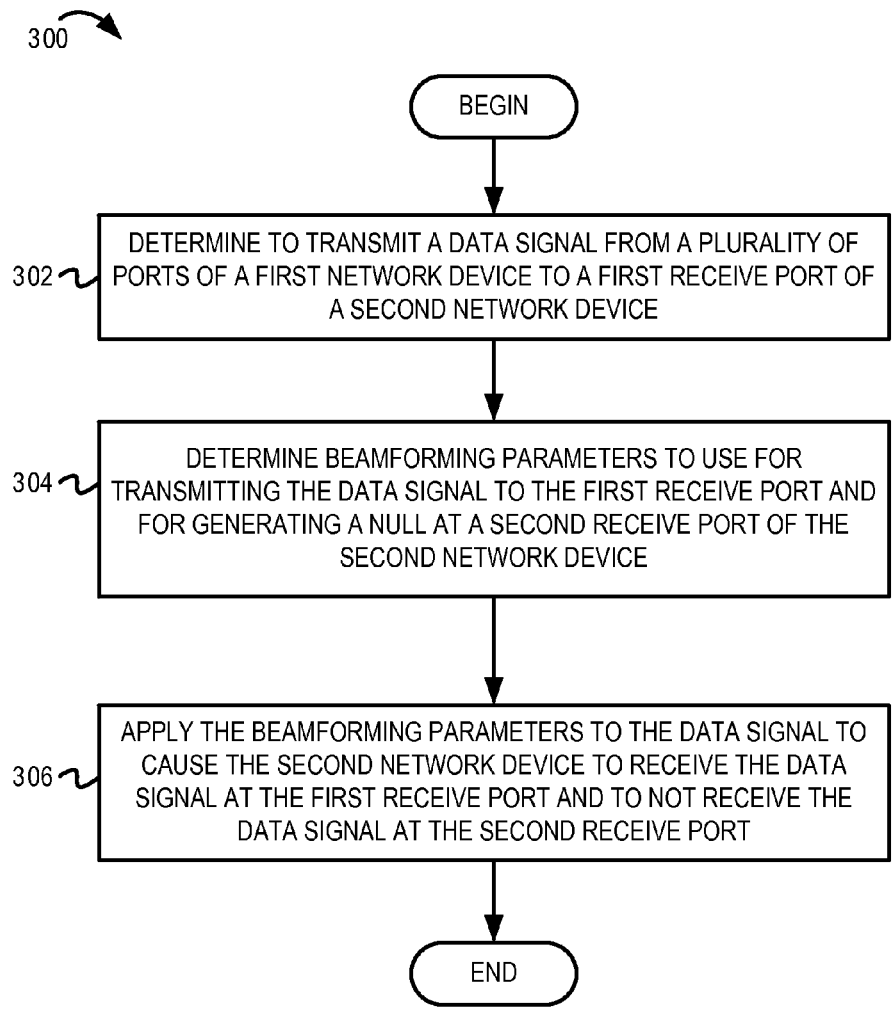
FIG. 3 is a flow diagram illustrating example operations for null beamforming in a communication network.

FIG. 3 is a flow diagram ("flow") 300 illustrating example operations for null beamforming in a communication network. The flow 300 begins at block 302.

At block 302, a first network device determines to transmit a data signal from a plurality of ports of the first network device to a first receive port of a second network device. Referring to the example of FIG. 2A, the transmitting network device 210 may determine to transmit a data signal from transmit ports 202 and 204 to a receive port 208 of the receiving network device 214. In some embodiments, the transmitting network device 210 may receive a notification from the receiving network device 214 identifying the active receive port 208. In another embodiment, the transmitting network device 210 and the receiving network device 214 may exchange messages to select the active receive port 208. The flow continues at block 304.

At block 304, the first network device determines beamforming parameters to be used for transmitting the data signal to the first receive port and for generating a null signal (NULL) at a second receive port of the second network device. In some embodiments, after determining the active receive port 208 of the receiving network device 214, the transmitting network device 210 may determine to generate a NULL at the other receive port 206 of the receiving network device 214. For example, the beamforming parameter estimation unit 106 may estimate the beamforming parameters that cause the receiving network device 214 to receive the data signal at the active receive port 208 and to not receive the data signal at the receive port 206. Operations for estimating the beamforming parameters for generating a NULL at the receive port 206 are described above with reference to FIGS. 2B and 2C and Eqs. 1a-8b. Additionally, the beamforming parameter estimation unit 106 may also select an appropriate beamforming parameter estimation technique (e.g., described above in FIGS. 2B and 2C) based, at least in part, on the processing capabilities (e.g., receive equalization capabilities) and the processing load of the receiving network device 214. The flow continues at block 306.

At block 306, the first network device applies the beamforming parameters to the data signal to cause the second network device to receive the data signal at the first receive port and to not receive the data signal at the second receive port. As described above with reference to FIGS. 2B and 2C, the transmitting network device 210 (e.g., the signal processing unit) may apply the beamforming parameters to signals $I_1$ and $I_2$ and transmit the beamformed signals via ports 202 and 204, respectively. After passing through the communication medium 212, the receiving network device 214 receives output signal $O_1$ and $O_2$ at ports 206 and 208, respectively. The signal $O_1$ is a NULL signal while the signal $O_2$ is a function of the input signal generated by the transmitting network device 210. From block 306, the flow ends.

Figure 4:
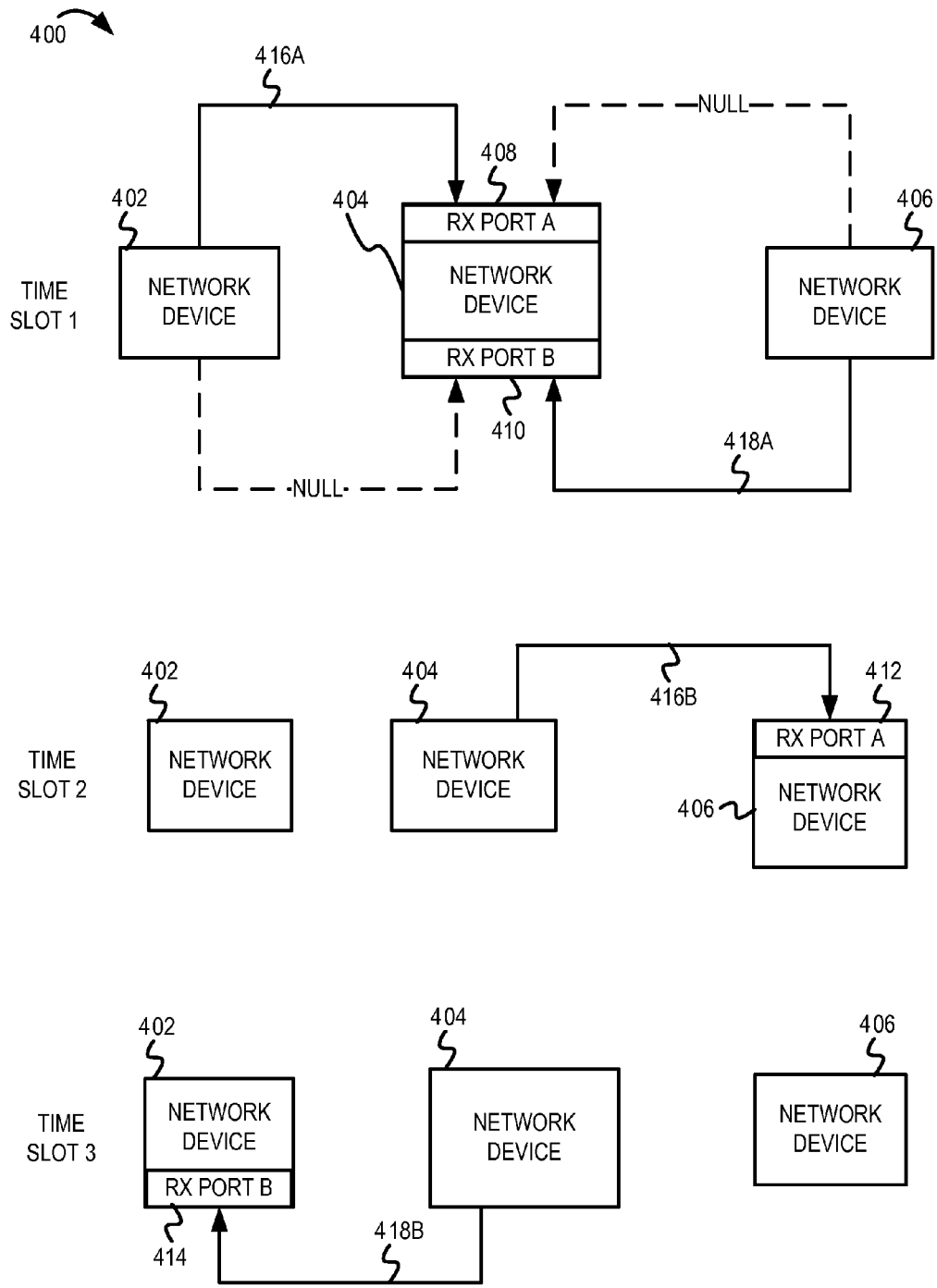
FIG. 4 is a block diagram illustrating an example mechanism for simultaneous reception from two network devices using null beamforming.

FIG. 4 is a block diagram illustrating an example mechanism for simultaneous reception from two network devices using null beamforming. FIG. 4 depicts a communication network 400 including three network devices 402, 404, and 406. In one embodiment, the communication network 400 may be a PLC network, the network device 402 may a PLC network gateway, the network device 404 may be a PLC repeater device, and the network device 406 may be a PLC end device. In some embodiments, the PLC network gateway 402 may operate as a central coordinator of the PLC network 400 and may facilitate communication between the PLC network 400 and external networks (e.g., the Internet). The PLC repeater device 404 may be a multi-port MIMO PLC store-and-forward repeater that is used to extend communication coverage within the PLC network 400. The PLC repeater device 404 may be situated electrically closer to the PLC network gateway 402 as compared to the PLC end device 406. In one embodiment, the network devices 402, 404, and 406 may be connected with each other using a linear configuration. For example, the network device 402 (e.g., the PLC network gateway) may be connected with the network device 404 (e.g., the PLC repeater device), which in turn, may be connected with the network device 406 (e.g., the PLC end device). However, in other embodiments, the network devices 402, 404, and 406 may be other suitable types of network devices that implement other suitable communication protocols and that are inter-connected in other suitable configurations.

Unlike the null beamforming technique shown in FIG. 4, typical end-to-end communication between the network devices 402 and 406 via the network device 404 typically utilizes four time intervals (e.g., time slots in a time domain multiple access (TDMA) environment). For example, two time slots may be used to provide connectivity for data originating from the network device 404, and two time slots may be used to provide connectivity for data originating from network devices 402 and 406. During a first time slot of a typical end-to-end communication, the network device 402 may transmit a data signal to the network device 404. Next, during a second time slot, the network device 404 may transmit a data signal to the network device 406. During a third time slot, the network device 406 may transmit a data signal to the network device 404. Finally, during a fourth time slot, the network device 404 may transmit a data signal to the network device 402.

FIG. 4 illustrates one embodiment for using null beamforming for complete uplink and downlink connectivity while minimizing the number of time slots used for relaying communications between the network devices 402 and 406 via the network device 404. In the example of FIG. 4, the network device 404 can relay a first communication from the network device 402 to the network device 406 and a second communication from the network device 406 to the network device 402 using three time slots. In this example, each of the network devices 402 and 406 may only implement a single beamforming unit. In another example described below in FIG. 5, the network device 404 can relay a first communication from the network device 402 to the network device 406 and a second communication from the network device 406 to the network device 402 using two time slots. In this example, the network device 404 may implement two beamforming units; while each of the network devices 402 and 406 may implement a single beamforming unit. As depicted in FIG. 4, the network devices 402 and 406 use null beamforming operations described in FIGS. 2B and 2C to transmit a data signal to a desired receive port of the network device 404 and to generate a NULL at the other receive port of the network device 404. In FIG. 4, the network device 404 is associated with receive ports 408 and 410 (depicted as Rx port A and Rx port B, respectively). During time slot 1, the network device 402 applies appropriate beamforming parameters to transmit data signal 416A to the receive port 408 and to generate a NULL at the receive port 410. Likewise, during time slot 1, the network device 406 applies appropriate beamforming parameters to transmit data signal 418A to the receive port 410 and to generate a NULL at the receive port 408. It is noted that the network device 402 generating the NULL at the receive port 410 does not prevent the network device 406 from transmitting the data signal 418A, block the data signal 418A, or disable the receive port 410. Instead, by generating the NULL at the receive port 410, the network device 402 can ensure that the data signal 416A is not received at the receive port 410 and is only received at the intended receive port 408. Likewise, by generating the NULL at the receive port 408, the network device 406 can ensure that the data signal 418A is not received at the receive port 408 and is only received at the intended receive port 410. This can minimize interference between the data signals 416A and the 418B and can allow the network device 404 to simultaneously receive independent data signals 416A and 418B at independent receive ports.

During time slot 2, the network device 404 forwards the data signal (depicted as data signal 416B) to receive port 412 of the network device 406. During time slot 3, the network device 404 forwards the data signal (depicted as data signal 418B) to receive port 414 of the network device 402. In some embodiments, the receive ports 408 and 410 may operate as transmit ports during the time slots 2 and 3. That is, the same physical ports may be utilized for both transmission and reception of data, depending upon the mode of operation. Thus, during time slot 2, the network device 404 may transmit the data signal 416B from port 408 to receive port 412 of the network device 406. Likewise, during time slot 3, the network device 404 may transmit the data signal 418B from port 410 to the receive port 414 of the network device 402. In other embodiments, the network device 404 may include a set of transmit ports that are distinct from the receive ports 408 and 410. The network device 404 may transmit the data signals 416B and 418B from the appropriate transmit port to the network devices 406 and 402, respectively. Although FIG. 4 does not depict the network device 404 generating a NULL at a receive port during time slots 2 and 3, embodiments are not so limited. In some embodiments, if the network device 406 comprises two receive ports, the network device 404 may transmit the data signal 416B to the desired receive port 412 and generate a NULL at the other receive port of the network device 406. Likewise, if the network device 402 comprises two receive ports, the network device 404 may transmit the data signal 418B to the desired receive port 414 and generate a NULL at the other receive port of the network device 402. In another embodiment, during the time slot 2, the network device 404 may transmit the data signal 416B to the desired receive port 412 and generate a NULL at the receive port 414 of the network device 402. Likewise, during the time slot 3, the network device 404 may transmit the data signal 418B to the desired receive port 414 and generate a NULL at the receive port 412 of the network device 402.

Figure 5:
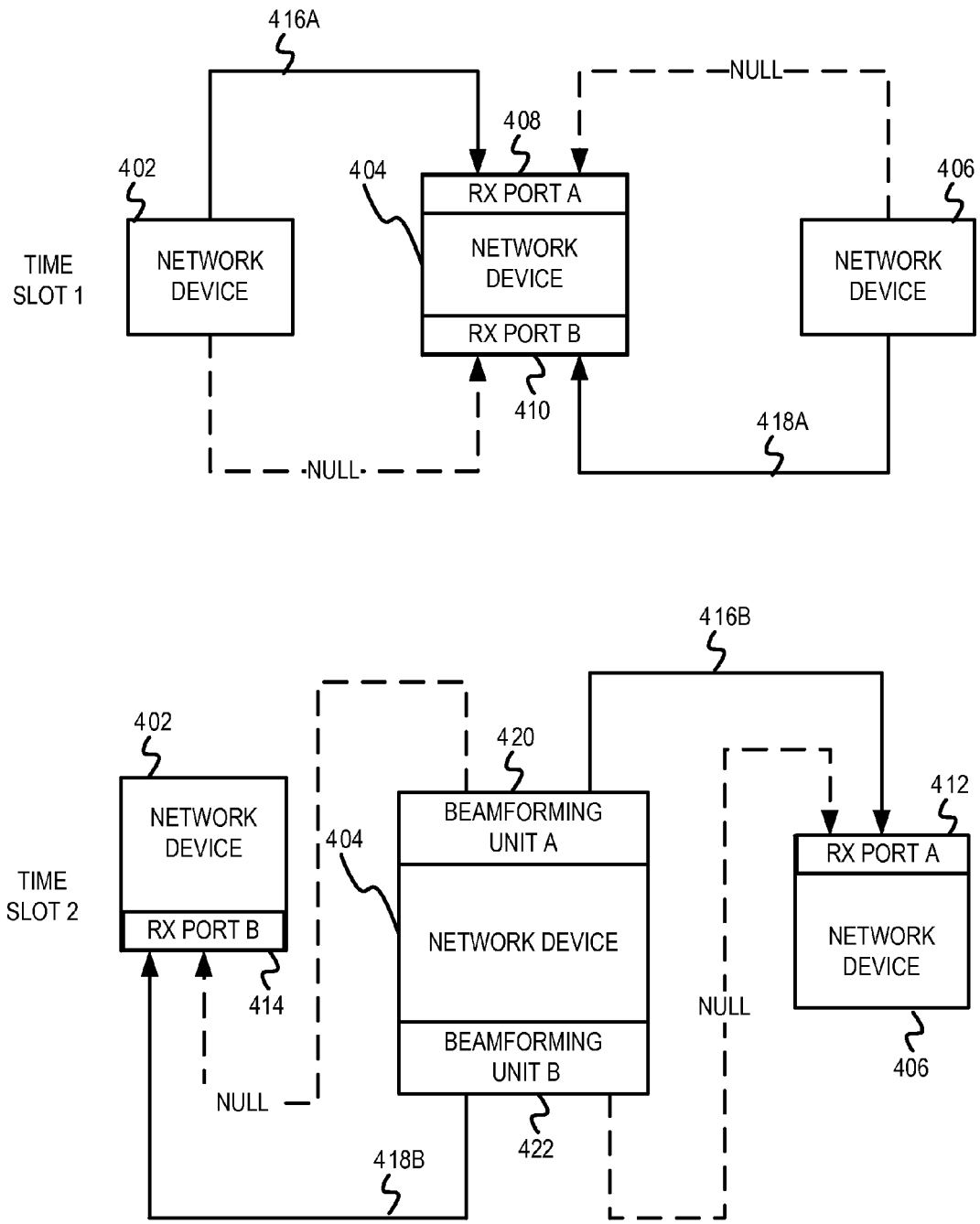
FIG. 5 is a block diagram illustrating another example mechanism for simultaneous reception from and simultaneous transmission to two network devices using null beamforming.

In another embodiment, the operations executed by the network device 404 in time slots 2 and 3 (of FIG. 4) may be combined into a single time slot, as depicted in FIG. 5. This can further reduce the number of time slots utilized for complete uplink and downlink connectivity. The network device 402 may execute similar operations as described above with reference to FIG. 4 for transmitting data signal 416A to the receive port 408 of the network device 404. Likewise, the network device 406 may execute similar operations as described above with reference to FIG. 4 for transmitting data signal 418A to the receive port 410 of the network device 404. For simultaneously transmitting data signals 416B and 418B to two different receiving network devices 402 and 406, the transmitting network device 404 may estimate the communication channel to each of the receiving network devices. For example, the network device 404 may estimate the communication channel to the receive ports associated with each of the network devices 402 and 406. Additionally, for simultaneously transmitting data signals 416B and 418B to two different receiving network devices, the network device 404 may be capable of simultaneously transmitting two separate data streams with independent beamforming parameters. The network device 404 can estimate two sets of beamforming parameters to simultaneously transmit independent data signals to two different receiving network devices 402 and 406. For each receiving network device 402 and 406, the network device 404 may calculate the beamforming parameters to generate a NULL at the appropriate receive port of the other network device.

With reference to the example of FIG. 5, the network device 404 may include two beamforming units 420 and 422 for transmitting independent data signals to two receiving network devices 402 and 406. Each of the beamforming units may be configured to transmit a data signal to a corresponding receiving network device. For example, the beamforming unit 420 may be configured to transmit a data signal to network device 406; while the beamforming unit 422 may be configured to transmit a data signal to network device 402. In some embodiments, the network device 404 may simultaneously communicate with the network device 406 via beamforming unit 420 and with the network device 402 via beamforming unit 422. Accordingly, the beamforming unit 422 may generate beamforming parameters to transmit the data signal 418B to the network device 402; while beamforming unit 420 may generate beamforming parameters to transmit the data signal 416B to the network device 406. In other words, the beamforming unit 420 may generate beamforming parameters for transmitting a data signal from the first transmit and second transmit ports to the network device 406; while the beamforming unit 422 may generate beamforming parameters for transmitting a data signal from the first and second transmit ports to the network device 402.

Referring to FIG. 5, the network device 402 is configured to receive a data signal from the network device 404 at port 414; while the network device 406 is configured to receive a data signal from the network device 404 at port 412. In this example, the beamforming unit 420 can generate a first set of beamforming parameters to transmit the data signal 416B to the receive port 412 of the network device 406 and to generate a NULL at the receive port 414 of the network device 402. The beamforming unit 422 can generate a second set of beamforming parameters to transmit the data signal 418B to the receive port 414 of the network device 402 and to generate a NULL at the receive port 412 of the network device 406. As described above with reference to FIG. 4, the beamforming unit 422 generating the NULL at the receive port 412 does not prevent the beamforming unit 420 from transmitting the data signal 416B to the receive port 412, does not block the data signal 416B, or does not disable the receive port 412. Instead, by generating the NULL at the receive port 412, the beamforming unit 422 can ensure that the data signal 418B is not received at the receive port 412 of the network device 406 and is only received at the intended receive port 414 of the network device 402. Likewise, by generating the NULL at the receive port 414, the beamforming unit 420 can ensure that the data signal 416B is not received at the receive port 414 of the network device 402 and is only received at the intended receive port 412 of the network device 406. This can minimize interference between independent transmissions 416B and 418B and can allow the network device 404 to simultaneously transmit independent data signals 416B and 418B to network devices 406 and 402, respectively. Operations for simultaneously transmitting independent data signals to multiple receiving network devices will be further described with reference to FIGS. 6A and 6B.

Figure 6A:
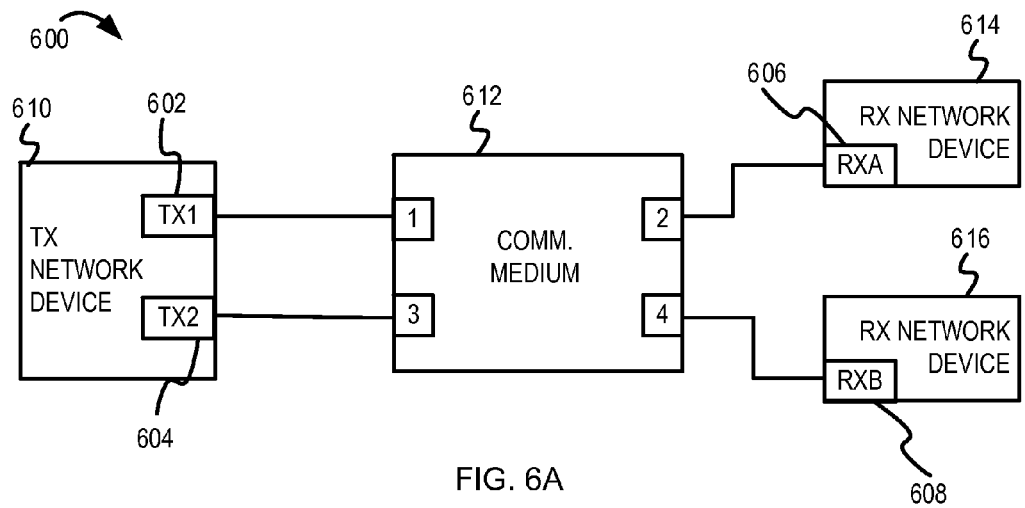
FIG. 6A is a communication system including a communication medium that couples a two-port transmitting network device with two receiving network devices.

FIG. 6A is a communication system 600 including a communication medium 612 that couples a transmitting network device 610 with receiving network devices 614 and 616. For simultaneously transmitting independent data signals to multiple receiving network devices, the communication medium 612 may be represented as a multiple-port network device including multiple input ports and multiple output ports. The communication medium 612 may include multiple communication channels between the transmitting network device 610 and the receiving network devices 614 and 616. For example, if the communication medium 612 is a MIMO PLC medium, the MIMO PLC medium may include an L-N communication channel, an L-PE communication channel, and/or other suitable PLC channels between the transmitting and receiving PLC devices. In the example of FIG. 6A, the MIMO PLC medium 612 is represented as a four-port network device with two input ports and two output ports. The two input ports are associated with the transmitting network device 610; while the two output ports are associated with the receiving network devices 614 and 616. The transmitting network device 610 includes transmit ports 602 and 604 (represented as TX1 and TX2, respectively). The receiving network device 614 is associated with a receive port 606 (RXA); and the receiving network device 616 is associated with a receive port 608 (RXB). In FIG. 6A, the transmit ports 602 and 604 are designated as input ports 1 and 3, respectively, of the communication medium 612. The receive ports 606 and 608 are designated as output ports 2 and 4, respectively, of the communication medium 612. The communication medium 612 between the transmitting network device 610 and the receiving network devices 614 and 616 may be represented in terms of S-parameters, as described above with reference to FIGS. 2A-2C.

The transmitting network device 610 may simultaneously transmit independent data signals to two distinct receiving network devices by multiplying a beamforming matrix (e.g., a 2×2 beamforming matrix) with a symbol vector (e.g., a 2×1 symbol vector) that includes data symbols for the two independent data streams. In one example, the transmitting network device 610 (e.g., the beamforming parameter estimation unit) may determine a beamforming matrix for each communication sub-carrier on which the network devices 610, 614, and 616 are configured to operate. The beamforming parameters may include the beamforming matrices associated with each of the communication sub-carriers. In Eq. 9, $s_1$ and $s_2$ represent input signals for the two data streams destined for the receiving network devices 614 and 616, respectively. $x_1$ and $x_2$ represent data signals that will be transmitted (after beamforming) from the transmitting network device 610 to the receiving network devices 614 and 616. $v_{1,1}$ and $v_{1,2}$ represent the beamforming parameters associated with transmit port 602 of the transmitting network device 610; while $v_{2,1}$ and $v_{2,2}$ represent the beamforming parameters associated with the transmit port 604 of the transmitting network device 610. The beamforming parameters may be determined as a combination of the scattering parameters, as depicted in Eqs. 10a-10d.

$$\begin{bmatrix} x_1 \\ x_2 \end{bmatrix} = \begin{bmatrix} v_{1,1} & v_{1,2} \\ v_{2,1} & v_{2,2} \end{bmatrix} \begin{bmatrix} s_1 \\ s_2 \end{bmatrix} \quad \text{Eq. 9}$$

$$v_{1,1} = -S23*S43/(S43*S21 - S23*S41) \quad \text{Eq. 10a}$$

$$v_{1,2} = -S43*S23/(S23*S41 - S43*S21) \quad \text{Eq. 10b}$$

$$v_{2,1} = S43*S21/(S43*S21 - S23*S41) \quad \text{Eq. 10c}$$

$$v_{2,2} = S23*S41/(S23*S41 - S43*S21) \quad \text{Eq. 10d}$$

In Eqs 10a-10d, $S_{ij}$ represents the scattering parameters associated with the communication medium 612 from the $j^{th}$ input port to the $i^{th}$ output port. The S-parameters typically depend on the frequency of the communication sub-carriers on which the transmitting network device 610 and the receiving network devices 614 and 616 operate. The communication sub-carriers on which the transmitting network device 610 and the receiving network devices 614 and 616 operate may be predefined based on the communication protocols (e.g., HomePlug AV protocols, IEEE 1901 protocols, etc.) implemented by the transmitting network device 610 and the receiving network devices 614 and 616.

Figure 6B:
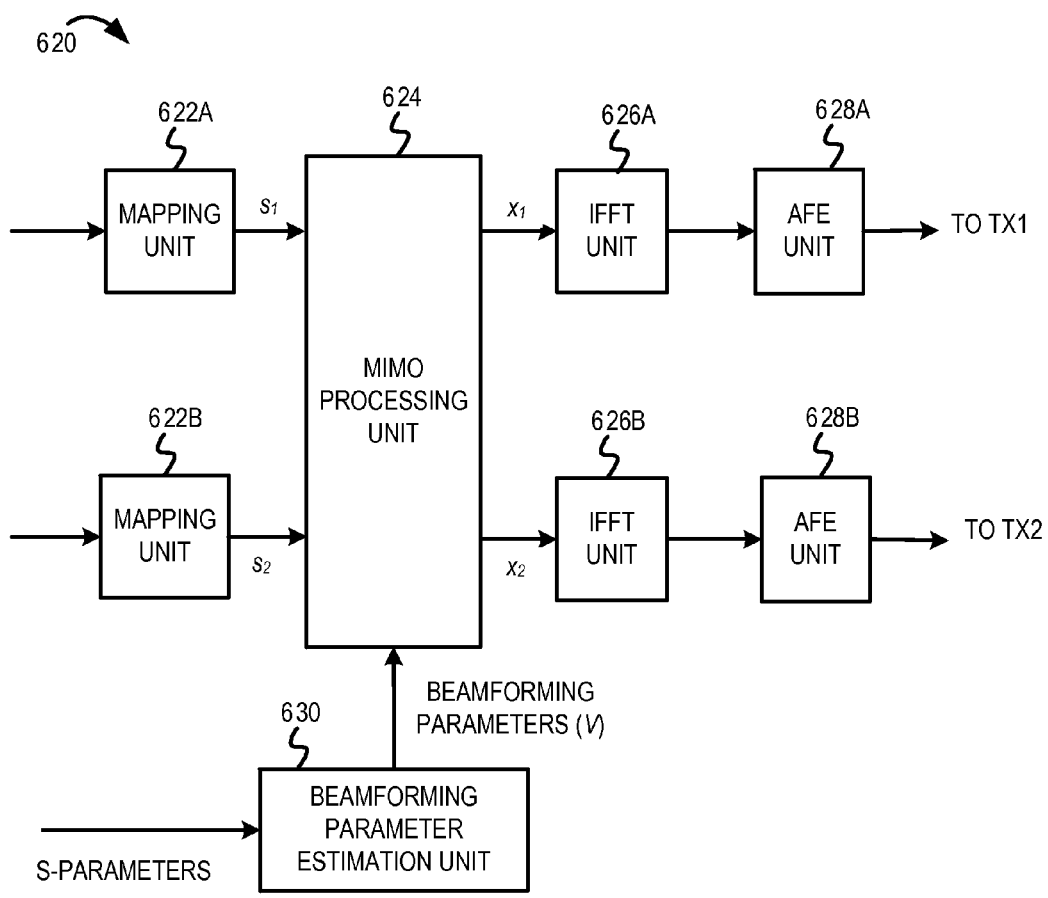
FIG. 6B is a portion of the transmitting network device configured to simultaneously transmit independent data signals to two receiving network devices.

FIG. 6B depicts a portion 620 of the transmitting network device 610 configured to simultaneously transmit independent data signals to two receiving network devices 614 and 616. The transmitting network device 610 includes two transmit chains. The transmitting network device 610 includes mapping units 622A and 622B, a MIMO processing unit 624, inverse fast Fourier transform (IFFT) units 626A and 626B, AFE units 628A and 628B, and a beamforming parameter estimation unit 630. The output of the AFE units 628A and 628B are coupled with the transmit ports 602 and 604, respectively. However, in other embodiments, the transmitting network device 610 may include another suitable number of transmit chains depending on the number of transmit ports associated with the transmitting network device 610. Although not depicted in FIG. 6B, the transmitting network device 610 may include other suitable pre-processing units, such as: A) a forward error correction (FEC) unit for encoding input data bits to be transmitted, B) an interleaving unit for interleaving the encoded input data bits to minimize frequency-selective fading and interference, and C) a bit-splitting or stream parsing unit for dividing the resultant input bit stream into two sub-streams. Alternatively, the transmitting device may utilize an independent set of FEC units, interleaving units, etc., for each independent stream of bits, which are to be transmitted to the two receiving network devices 614 and 616. In some embodiments, each independent stream of bits may be generated by an independent processing unit (e.g., an application or another suitable data source) of the transmitting network device 610. Each independent data stream may be subject to symbol mapping, FFT operations, etc. as will be further described below.

Each bit stream is provided to a corresponding independent mapping unit 622A and 622B. The mapping units 622A and 622B may convert the input bits in their respective bit stream onto corresponding symbols. Each of the mapping units 622A and 622B may convert an input bit stream into a symbol stream, such that the number of symbols is less than or equal to the number of bits. In some embodiments, the mapping unit 622A and the mapping unit 622B may use the same modulation scheme to map the input bit stream to a symbol stream. In other embodiments, the mapping unit 622A and the mapping unit 622B may each use a different modulation scheme to map the input bit stream to a symbol stream. With reference to Eq. 9, $s_1$ and $s_2$ represent the symbol streams generated at the output of the mapping units 622A and 622B, respectively. It is noted that the symbol streams $s_1$ and $s_2$ may include symbols transmitted on one or more communication sub-carriers of the MIMO OFDM communication network.

The beamforming parameter estimation unit 630 determines the beamforming parameters (V) for independently transmitting data streams to two receiving network devices 614 and 616, as described above using Eqs. 10a-10d. As described above, the beamforming parameters may be generated to direct a data signal to a desired receiving network device while generating a NULL at another receiving network device. In the example of FIG. 6A, the beamforming parameter estimation unit 630 may generate the beamforming parameters V to transmit a first symbol stream $s_1$ to the receive port 606 of the network device 614 and to transmit a second symbol stream $s_2$ to the receive port 608 of the network device 616. The beamforming parameters V may also ensure that the first symbol stream $s_1$ is not received at the receive port 608 of the network device 616 and that the second symbol stream $s_2$ is not received at the receive port 606 of the network device 614. The MIMO processing unit 624 receives the symbol streams $s_1$ and $s_2$ and the beamforming parameters (V). The MIMO processing unit 624 may implement functionality for spatial multiplexing, beamforming, space-time coding, etc. The MIMO processing unit 624 may apply the beamforming parameters (V) to the symbol streams $s_1$ and $s_2$ to yield the output signals $x_1$ and $x_2$, as depicted by Eq. 9. It is noted that the resultant output signals $x_1$ and $x_2$ may include output signals associated with each communication sub-carrier of the MIMO OFDM communication network on which the transmitting network device 610 and the receiving network devices 614 and 616 are scheduled to operate.

The resultant output signals $x_1$ and $x_2$ are provided to the IFFT units 626A and 626B, respectively. The IFFT units 626A and 626B convert the respective frequency-domain symbol stream into a time-domain signal. The output of the IFFT units 626A and 626B is provided to corresponding AFE units 628A and 628B. The AFE units 628A and 628B may each include functionality for converting the output signals from the digital domain to the analog domain, filtering the output signals, and amplifying the output signals. In some embodiments, the output of the IFFT units 626A and 626B may be subject to cyclic prefix operations, window and overlap operations, preamble insert operations, etc. before being provided to the AFE units 628A and 628B. The resultant output signals may be transmitted from the transmit ports 602 and 604 via the communication medium 612. The receiving network devices 614 and 616 may receive appropriate output signals at the receive ports 606 and 608, respectively, based, at least in part, on the beamforming parameters, as described above. In some embodiments, the signal processing units 110 and 116 of FIG. 1 may each include the mapping units 622A and 622B, the MIMO processing unit 624, the IFFT units 626A and 626B, the AFE units 628A and 628B, and/or other processing units such as the bit splitting or stream parsing unit, the FEC unit, etc. Additionally, the signal processing units 110 and 116 may each include one or more components for processing received signals. For example, the signal processing units 110 and 116 may each include a decoding unit, a bit combining or stream de-parsing unit, etc. In some embodiments, some of the processing components (e.g., AFE units) may be used for both processing data signals scheduled for transmission and processing received data signals. In other embodiments, the network device may include one set of components (e.g., a first set of AFE units) for processing data signals scheduled for transmission and a different set of components (e.g., a second set of AFE units) for processing received data signals.

In some embodiments, the network devices 610, 614, and 616 may be PLC-capable devices. In one example of this embodiment, the network device 610 may transmit the data signals from an L-N transmit port and an L-PE transmit port onto an L-N PLC channel and an L-PE PLC channel, respectively. The L-N PLC channel may be formed by a line and neutral wire pair of the powerline network. The L-PE PLC channel may be formed by a line and protective earth wire pair of the powerline network. In other embodiments, other suitable transmit ports may be used to transmit the data signals on another suitable number of PLC channels of the PLC network. In some embodiments, the network device 610 may dynamically select the transmit ports for transmitting the data signals. For example, the network device 610 may select the transmit ports based, at least in part, on a performance measurement associated with each of the PLC channels. In another embodiment, the transmit ports that should be used for transmitting the data signals may be predetermined. In another embodiment, the network device 610 may exchange messages with the receiving PLC devices 614 and 616 to select the transmit ports.

In some embodiments, the operations described in FIGS. 4, 5, 6A, and 6B may be extended to allow the network device 610 to simultaneously communicate with multiple network devices 614 and 616 using different communication protocols. In this embodiment, networking functionality of the network device may be partitioned into sub-functions using a "layered" approach, consistent with the International Standards Organization (ISO) Open Systems Interconnection (OSI) reference model. The set of networking protocol layers ("protocol stack") is typically divided into "upper protocol layers" and "lower protocol layers." The lower protocol layers include the physical (PHY) layer, the medium access control (MAC) layer, and the logical link control (LLC) layer. Typically, the number of PHY layers and corresponding MAC and LLC layers is determined based on the number of ports associated with the network device. For example, if the network device includes two ports, the protocol stack of the network device typically includes two PHY layers, and correspondingly two MAC and LLC layers. Each of the PHY layers and the corresponding MAC and LLC layers couple the network device to one (possibly distinct) communication network. The upper protocol layers can include a network layer, a transport layer, and one or more applications. For the network device 610 to simultaneously transmit or receive data signals from multiple network devices 614 and 616 using different communication protocols, the protocol stack of the network device 610 may include multiple lower protocol layers (e.g., PHY layer, MAC layer, and LLC layer). Each set of lower protocol layers may be configured to support a different communication protocol. The protocol stack of the network device 610 may include a single or shared set of upper protocol layers.

In one embodiment, a network device (e.g., a PLC gateway device) that supports two different PLC protocols may use the null beamforming operations to simultaneously communicate with a first network device using a first PLC protocol and communicate with a second network device using a second PLC protocol. Using the null beamforming operations can also preclude the network device from using time sharing protocols (e.g., IEEE 1901 inter-system protocol (ISP)) for transmitting communications to the first and the second network devices. Referring to the example of FIG. 6A, the transmit ports 602 and 604 of the network device 610 may implement a different communication protocol. For example, the transmit port 602 may transmit data signals using a first communication protocol (e.g., ITU-T G.hn protocol). The transmit port 604 may transmit data signals using a second communication protocol (e.g., HomePlug AV2 protocol). The transmit port 602 may be coupled with a first set of processing units (e.g., AFE unit, a PHY processing unit, a MAC processing unit, a LLC processing unit, etc.) that operate using the first communication protocol. Likewise, the second transmit port 604 may be coupled with a second set of processing units that operate using the second communication protocol. As described above with reference to FIGS. 5, 6A, and 6B, the network device 610 may use two beamforming units to transmit independent data signals to two network devices 614 and 616. With reference to the above example, the receive port 606 of the network device 614 may implement the first communication protocol (e.g., ITU-T G.hn protocol) and the receive port 608 of the network device 616 may implement the second communication protocol (e.g., HomePlug AV protocol). Each beamforming unit may estimate beamforming parameters to transmit a data signal to the receive port of the desired receiving network device and to generate a NULL at the receive port of the other receiving network device. With reference to the above example, a first beamforming unit of the network device 610 may estimate beamforming parameters to transmit a first data signal to the receive port 606 of the network device 614 using the ITU-T G.hn protocol and to generate a NULL at the receive port 608 of the network device 616. At the same time, a second beamforming unit of the network device 610 may estimate beamforming parameters to transmit a second data signal to the receive port 608 using the HomePlug AV protocol and to generate a NULL at the receive port 606. In other embodiments, the network device 610 may sequentially transmit data signals to the network devices 614 and 616 in a time-shared manner, as described above in FIG. 4. For example, the network device 610 may transmit the first data signal to the receive port 606 using the first communication protocol during a first time slot. After transmitting the first data signal, the network device 610 may transmit the second data signal to the receive port 608 using the second communication protocol during a second time slot.

In some embodiments, referring to the example of FIG. 5, a network device 402 may transmit a data signal to the network device 404 that implements multiple communication protocols. For example, the receive port 408 may implement a first communication protocol, while the receive port 410 may implement a second communication protocol. To transmit a data signal to the receive port 408, the network device 402 may use the first communication protocol to transmit a data signal to the receive port 408 of the network device 404. In this example, the network device 402 may estimate beamforming parameters to transmit the data signal 416A to the port 408 using the first communication protocol, while generating a NULL at the port 410 (associated with the second communication protocol). Likewise, the network device 406 may use the second communication protocol to transmit a data signal to the port 410 of the network device 404. In this example, the network device 406 may estimate beamforming parameters to transmit the data signal 418A to the port 410 using the second communication protocol, while generating a NULL at the port 408 (associated with the first communication protocol).

The network device 404 may include two receive units to simultaneously receive data signals 416A and 418A from network devices 402 and 406, respectively. In some embodiments, each of the receive ports 408 and 410 may be associated with a corresponding AFE unit, PHY processing unit, MAC processing unit, and LLC processing unit, as similarly described above. For example, the receive port 408 and a corresponding set of processing units may implement a first communication protocol (e.g., ITU-T G.hn protocol). The receive port 410 and a corresponding set of processing units may implement a second communication protocol (e.g., HomePlug AV protocol). Transmitting network devices that implement the first communication protocol may be configured to transmit data signals to the receive port 408 of the network device 404. Likewise, transmitting network devices that implement the second communication protocol may be configured to transmit data signals to the receive port 410 of the network device 404. In other embodiments, however, the network device 404 may transmit and receive communications from the same port (e.g., a common transmit port and receive port). The transmit portion and the receive portion of a port may share one or more processing units (e.g., AFE unit, PHY processing unit, MAC processing unit, and LLC processing unit, etc.). In another embodiment, the network device 404 may include separate transmit ports and receive ports, but may include a common set of processing units that process transmit signals and received signals.

In some embodiments, the null beamforming operations may be used for load balancing in a communication network. A network device may use the null beamforming operations to enhance performance (e.g., receive port throughput) at other heavily-loaded network devices. For example, if a transmitting network device determines that a first network device has a high resource utilization in a shared communication network, the transmitting network device may estimate beamforming parameters so that the first network device does not receive the data stream intended for a second network device, as will be further described below in FIG. 7.

Figure 7:
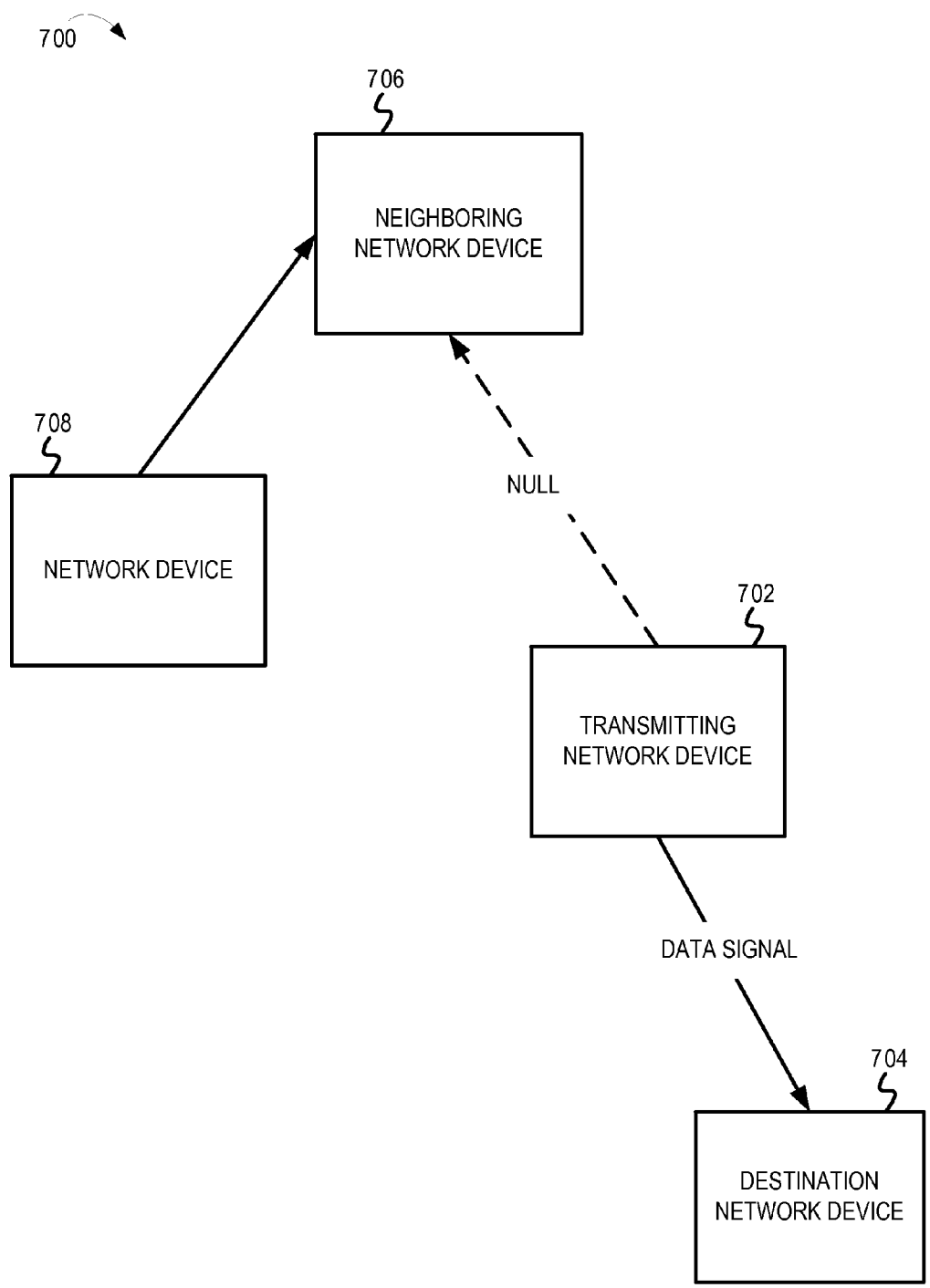
FIG. 7 is an example conceptual diagram illustrating a mechanism for load balancing using null beamforming.

FIG. 7 depicts a communication network 700 including network devices 702, 704, 706, and 708. In some embodiments, the network devices 702, 704, 706, and 708 may each be PLC-capable devices. In other embodiments, the network devices 702, 704, 706, and 708 may implement other suitable wired or wireless communication protocols. In the example of FIG. 7, the network device 702 generates a data signal for subsequent transmission to the network device 704. Accordingly, the network device 702 may be referred to as "transmitting network device" and the network device 704 may be referred to as "destination network device." The network device 706 may be within a communication distance of the network device 702 and may detect transmissions initiated by the network device 702. In FIG. 7, the network device 706 is referred to as "neighboring network device." In some embodiments, the transmitting network device 702 may determine that the neighboring network device 706 has high receive utilization (e.g., is heavily loaded or utilizing a high amount of processing, memory, bandwidth resources). Accordingly, the transmitting network device 702 may estimate beamforming parameters to generate a NULL at the receive port of the neighboring network device 706 and to transmit a data signal to the destination network device 704. In doing so, the neighboring network device 706 may not detect the data signal intended for the destination network device 704, and may only receive data signals transmitted by the network device 708. By generating a NULL at the neighboring network device 706, the transmitting network device 702 can minimize interference between transmissions of the network devices 702 and 708 and preclude the network devices 702 and 708 from having to time share the communication medium by initiating transmissions during non-overlapping time intervals. Furthermore, the transmitting network device 702 generating a NULL at the neighboring network device 706 can preclude the network device 706 from analyzing the header of the data signal to determine whether to process the remainder of the data signal (e.g., which can consume additional resources).

In some embodiments, the neighboring network device 706 may have multiple receive ports. In this embodiment, the transmitting network device 702 may identify the receive port of the neighboring network device 706 that is associated with a preferred performance (e.g., the highest SNR when it is communicating with the network device 708) in the absence of a transmission from the transmitting network device 702. The receive port associated with the preferred performance may be designated as the active receive port of the neighboring network device 706. The transmitting network device 702 may generate a NULL at the active receive port of the neighboring network device 706. Alternatively, the transmitting network device 702 may generate the NULL at a receive port of the neighboring network device 706 that is associated with a highest medium utilization. Alternatively, the transmitting network device 702 may receive an indication (e.g., from the neighboring network device 706, a central coordinator, etc.) of the active receive port associated with the neighboring network device 706. The transmitting network device 702 may generate a NULL at the active receive port of the neighboring network device 706.

A network device that has multiple transmit ports may estimate beamforming parameters for: A) null beamforming applications that improve performance at the nulled port (e.g., of the neighboring network device 706), or B) beam-steering applications that improve the signal strength of the data signal received at the desired receiving network device 704. In some embodiments, the transmitting network device 702 may determine whether to execute null beamforming operations to improve performance associated with the neighboring network device 706 or beam-steering operations to boost the signal strength of the data signal transmitted to the destination network device 704. The network device 702 may determine whether to use null beamforming operations or beam steering operations based, at least in part, on a processing load (also referred to as medium utilization, Q-depth or resource utilization) associated with the network devices 704 and 706. In some embodiments, the network devices 702, 704, 706, and 708 may be associated with a central coordinator (not shown) of the communication network 700. The central coordinator may monitor communications transmitted and received by the network devices 702, 704, 706, and 708 and may estimate the processing load associated with each of the network devices. In other embodiments, each of the network devices may estimate their respective processing load and broadcast this information in the communication network 700. For example, if the processing load associated with the neighboring network device 706 is high and the processing load associated with the destination network device 704 is low, the transmitting network device 702 may generate a NULL at the neighboring network device 706. In this example, the transmitting network device 702 may generate a NULL at the receive port (of the neighboring network device 706) that is associated with a high processing load (or a least preferred performance measurement). As another example, if the transmit Q-depth associated with the transmitting network device 702 exceeds the transmit Q-depth of the network device 708, the transmitting network device 702 may not generate a NULL at the neighboring network device 706. Instead, the transmitting network device 702 may estimate beamforming parameters to steer the data signal towards and enhance the performance of the destination network device 704. In other embodiments, the network device 702 may use other suitable techniques to determine whether to enhance the gain in the direction of the desired transmission (e.g., using beam steering) or whether to generate a NULL to minimize additional loading and interference at a network device with a high processing load.

Figure 8:
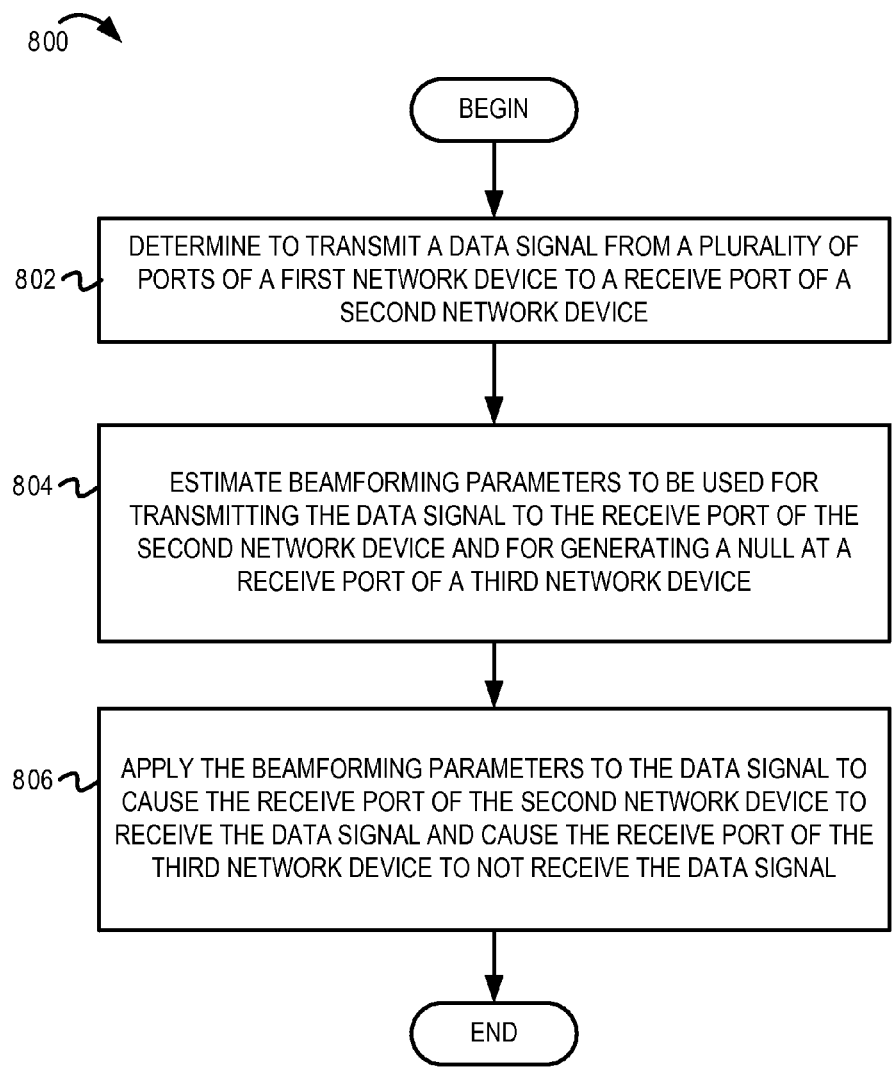
FIG. 8 is a flow diagram illustrating example operations for null beamforming in a communication network.

FIG. 8 is a flow diagram 800 illustrating example operations for null beamforming in a communication network. The flow 800 begins at block 802.

At block 802, a first network device determines to transmit a data signal from a plurality of ports of the first network device to a receive port of a second network device. Referring to the example of FIG. 6A, the transmitting network device 610 may determine to transmit a data signal from transmit ports 602 and 604 to a receive port 606 of the receiving network device 614. In some embodiments, the transmitting network device 610 may receive a notification from the receiving network device 614 identifying the active receive port 606. In another embodiment, the transmitting network device 610 and the receiving network device 614 may exchange messages to select the active receive port 606. The flow continues at block 804.

At block 804, the first network device estimates beamforming parameters to be used for transmitting the data signal to the receive port of the second network device and for generating a null signal (NULL) at a receive port of a third network device. In some embodiments, after determining the active receive port 606 of the receiving network device 614, the transmitting network device 610 may determine to generate a NULL at the receive port 608 of another receiving network device 616. In one embodiment, the first network device may generate a NULL at the receive port of the third network device to minimize interference with a data signal transmitted by another network device to the receive port of the third network device, as described above with reference to FIG. 4. In another embodiment, the first network device may generate a NULL at the receive port of the third network device to prevent the third network device from receiving the data signal destined for the second network device, as described above with reference to FIGS. 5 and 6A. In another embodiment, the first network device may generate a NULL at the receive port of the third network device, if the third network device does not support the communication protocol associated with the data signal (and the receive port of the second network device). In another embodiment, the first network device may generate a NULL at the receive port of the third network device to minimize the processing load at the third network device, as described above with reference to FIG. 7. Referring to the example of FIG. 6A, the beamforming parameter estimation unit may estimate the beamforming parameters that allow the network device 610 to transmit the data signal to the receive port 606 of the network device 614 and to ensure that the data signal is not received at the receive port 608 of the network device 616. Operations for estimating the beamforming parameters for transmitting a data signal to the second network device and generating a NULL at the third network device are described above with reference to FIGS. 4-7 and Eqs. 9-10d. For example, the beamforming parameters may be estimated so that the input signal associated with the second data stream ($s_2$) in FIG. 6B is set to 0 (or NULL) and only a single data stream $s_1$ is transmitted. The flow continues at block 806.

At block 806, the first network device applies the beamforming parameters to the data signal to cause the receive port of the second network device to receive the data signal and cause the receive port of the third network device to not receive the data signal. With reference to the example of FIG. 6A, the network device 610 (e.g., the signal processing unit) may apply the beamforming parameters to the input data signal $s_1$ associated with the first data stream in FIG. 6B, and transmit the beamformed signal via ports 602 and 604. After passing through the communication medium 612, the network device 614 receives an output signal at receive port 606, while the network device 616 receives an output signal at receive port 608. From block 806, the flow ends.

The signal received at a port subject to the null beamforming (i.e., nulled receive port) may not include any data but may include noise and interference from the communication channel. Therefore, a receiving network device can use the signal which is sampled at the nulled receive port to actively cancel noise and interference received along with the data signal at an active receive port, as will be further described in FIGS. 9A and 9B.

FIG. 9A is a block diagram illustrating an example mechanism for correlated noise cancellation at a receiving network device 900. The receiving network device 900 includes two receive ports 902 and 904, two AFE units 906 and 908, and a noise cancellation unit 910. For example, the receive ports 902 and 904 may be an L-N receive port and an L-PE receive port, respectively. The AFE unit 906 is coupled with the receive port 902; while the AFE unit 908 is coupled with the receive port 904. The noise cancellation unit 910 includes an error signal generation unit 912 and a combining unit 914. FIG. 9B further depicts an example block diagram of the noise cancellation unit 910. The error signal generation unit 912 includes a channel parameter estimation unit 916 and a multiplier 918. The outputs of the AFE units 906 and 908 are provided to the channel parameter estimation unit 916. The output of the AFE unit 906 (associated with the nulled receive port 902) is provided to the multiplier 918. Additionally, the output of the channel parameter estimation unit 916 is also provided to the multiplier 918. The output of the multiplier 918 and the output of the AFE unit 908 (associated with the active receive port 904) are provided to an adder 920. The output of the adder 920 is provided for subsequent processing and for extracting the information provided by a transmitting network device.

In the example of FIG. 9A, a transmitting network device may generate a NULL at the receive port 902 of the receiving network device 900. Accordingly, the receiving network device 900 may not receive a data signal from the transmitting network device at the receive port 902. The receiving network device may receive the data signal from the transmitting network device at the receive port 904. In this example, the receive port 902 may be the nulled receive port; while the receive port 904 may be the active receive port. Although the receiving network device 900 does not receive the data signal at the nulled receive port 902, the receiving network device 900 may receive a "noise" signal at the nulled receive port 902. The noise signal may be generated because of transmissions from other network devices in the communication network, interference between other network devices, cross-talk, co-channel interference, and/or other variations in the communication network. For example, the noise signal in a PLC network may include transients that are generated when network devices connected to the PLC network are switched ON or OFF. The noise signal has an adverse impact on the performance of the received data signal at the active receive port 904, and hence it is desirable to minimize the impact of the noise signal.

The receiving network device 900 may sample the noise signal at the nulled receive port 902 for noise cancellation at the active receive port 904. The receiving network device 900 may use the noise signal at the nulled receive port for noise cancellation if there is a correlation between the noise detected at the nulled receive port and the active receive port. Therefore, for noise cancellation, the nulled receive port and the active receive port may be associated with the same receiving network device. Furthermore, to ensure that the receiving network device 900 can sample the noise signal at the nulled receive port 902, the receiving network device 900 may not receive a data signal from another transmitting network device at the nulled receive port (as described above in FIGS. 4 and 5). The noise cancellation unit 910 may utilize information regarding the correlation of the noise signal between the nulled receive port 902 and the active receive port 904 to process the noise signal received at the nulled receive port 902. The noise cancellation unit 910 may generate an error signal for minimizing (or cancelling) the noise signal at the active receive port 904. The receiving network device 900 can use various techniques for estimating the error signal from the noise signal sampled at the nulled receive port 902 to cancel noise and interference at the active receive port 904.

In one embodiment, the noise cancellation unit 910 may take advantage of different types of signals received at the ports 902 and 904 depending on the operating state in which the receiving network device 900 is configured. For example, the receiving network device 900 may be configured to operate in a receive operating mode, a transmit operating mode, or an idle operating mode. In the receive operating mode, the receiving network device 900 may actively receive data signals transmitted by a transmitting network device. While the receiving network device 900 is configured in the receive operating mode, the transmitting network device may generate a NULL at one of the receive ports of the receiving network device. In the transmit operating mode, the network device 900 may a transmit data signal to another network device. In the idle operating mode the network device 900 may neither receive data signals from nor transmit data signals to another network device. Although when the network device 900 is configured in the idle operating mode, other network devices in the communication network may communicate with each other and become sources of noise and interference to the network device 900. Furthermore, in a PLC network, electrical appliances (e.g., mobile phones, consumer appliances, etc.) may also generate electrical interference in the PLC network. Additionally, the PLC network may receive radio signals from other communication networks. When the network device 900 is configured in the idle operating mode, the noise cancellation unit 910 may analyze signals received simultaneously at the ports 902 and 904. The signals received at the ports 902 and 904 are represented by Eq. 11 and Eq. 12, respectively.

$$r_1 = s_1 + n_1 \qquad \text{Eq. 11}$$

$$r_2 = hs_1 + n_2 \qquad \text{Eq. 12}$$

In some embodiments, the receiving network device 900 may have a priori knowledge of which of its receive ports will be designated as the active receive port. The other receive port may be designated as the nulled receive port. In the above equations, $r_1$ represents the signal received at the designated nulled receive port (e.g., the receive port 902). $s_1$ represents the signal component of the signal received at the receive port 902; while $n_1$ represents the noise component of the signal received at the receive port 902. $r_2$ represents the signal received at the designated active receive port (e.g., the receive port 904). $n_2$ represents the noise component of the signal received at the receive port 904. As depicted in Eq. 11 and Eq. 12, the signal components $s_1$ and $s_2$ are correlated with each other. However, the noise components $n_1$ and $n_2$ may not be correlated with each other. Furthermore, h represents the relative channel parameter at the receive port 904 with respect to the receive port 902. The relative channel parameter h may be represented as a complex number to describe the relative phase and relative amplitude between the receive ports 902 and 904.

Referring to the example of FIG. 9B, the channel parameter estimation unit 916 receives signals $r_1$ and $r_2$ from the nulled receive port 902 and the active receive port 904, respectively. If the uncorrelated noise components $n_1$ and $n_2$ are weak with respect to the correlated received signal component $s_1$, the channel parameter estimation unit 916 can estimate the relative channel parameter as $\hat{h}$ by dividing $r_2$ by $r_1$ as depicted by Eq. 13.

$$\hat{h} = \frac{r_2}{r_1} \qquad \text{Eq. 13}$$

In some embodiments, the channel parameter estimation unit 916 may execute signal averaging operations to improve the estimate of the relative channel parameter $\hat{h}$. In one example, the channel parameter estimation unit 916 may coherently average the estimated values of $\hat{h}$ for the corresponding communication sub-carriers of contiguously sampled time domain blocks.

As described above, the channel parameter estimation unit 916 estimates the relative channel parameter $\hat{h}$ when the network device 900 is configured in the idle operating mode. The noise cancellation unit 910 can subsequently use the relative channel parameter $\hat{h}$ when the network device 900 is configured in the receive operating mode to cancel out the undesired signal component $s_1$. Specifically, during the receive operating mode, the noise cancellation unit 910 may receive the signal $r_1$ via the nulled receive port 902, as described with reference to Eq. 11. The noise cancellation unit 910 may also receive the signal $r_2$ and via the active receive port 904, as described with reference to Eq. 12. The multiplier 918 (depicted in FIG. 9B) may multiply the signal $r_1$ received via the nulled receive port by $-\hat{h}$. The combining unit 914 (e.g., the adder 920 of FIG. 9B) may add the output of the multiplier 916 ($-\hat{h}r_1$) to the signal $r_2$ received from the active receive port 904 to minimize the correlated noise and interference components from the signal $r_2$. The resultant equalized signal $r_{eq}$ (also referred to as corrected signal) may be represented by Eq. 14.

$$r_{eq} = r_2 - \hat{h}r_1 \qquad \text{Eq. 14}$$

The corrected signal $r_{eq}$ may include user data originally transmitted by the transmitting network device. The corrected signal may also include residual uncorrelated noise components from both the active receive port and the nulled receive port. The corrected signal may be further processed (as described above in FIGS. 2B and 2C) to recover the user data. It is noted that in other embodiments, the noise cancellation unit 910 may use other suitable techniques to determine the correlation between the noise on the nulled receive port and the active receive port and to cancel the correlated noise/interference from the active receive port.

Figure 10:
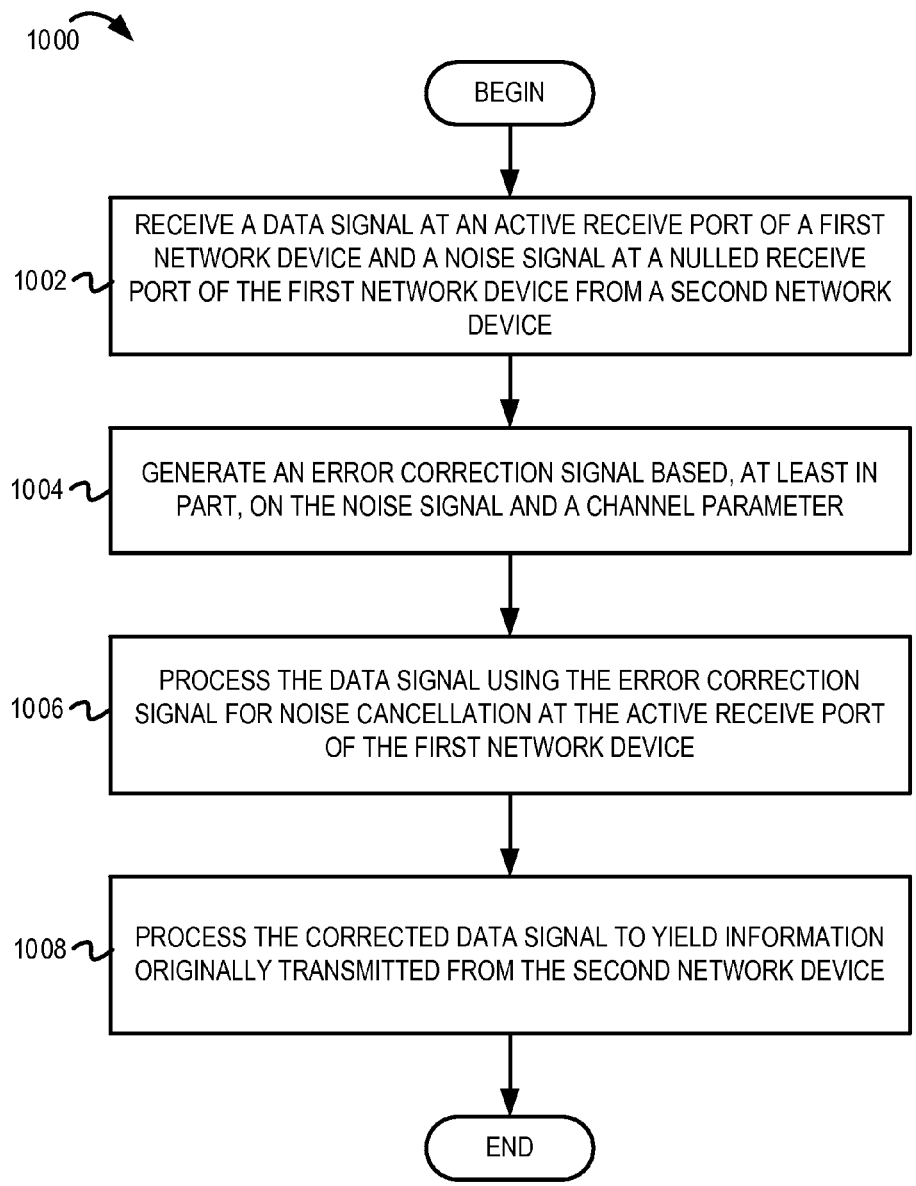
FIG. 10 is a flow diagram illustrating example operations for noise cancellation in a communication network.

FIG. 10 is a flow diagram 1000 illustrating example operations for noise cancellation in a communication network. The flow 1000 begins at block 1002.

At block 1002, a first network device receives a data signal from a second network device at an active receive port and receives a noise signal at a nulled receive port. As described above with reference to FIG. 9A, the noise cancellation unit 910 may receive the signal $r_1$ via the nulled receive port 902, as described with reference to Eq. 11. The noise cancellation unit 910 may also receive the signal $r_2$ via the active receive port 904, as described with reference to Eq. 12. The flow continues at block 1004.

At block 1004, the first network device generates an error correction signal based, at least in part, on the noise signal and a channel parameter associated with the active receive port and the nulled received port of the first network device. As described above with reference to FIGS. 9A and 9B, the channel parameter estimation unit 916 estimates the relative channel parameter $\hat{h}$ when the network device 900 is configured in the idle operating mode. The channel parameter estimation unit 916 estimates the relative channel parameter based, at least in part, on signals received at the receive ports 902 and 904, when the network device 900 is configured in the idle operating mode. During the receive operating mode, the noise cancellation unit 910 can combine the noise signal received via the nulled receive port with the channel parameter, as depicted with reference to Eq. 14. The combination of the noise signal received via the nulled receive port with the channel parameter is referred to as the "error correction signal." The flow continues at block 1006.

At block 1006, the first network device processes the data signal using the error correction signal for noise cancellation at the active receive port of the first network device. For example, the combining unit 914 may combine the error correction signal with the data signal for noise cancellation at the active receive port. As described above with reference to FIGS. 9A and 9B, the combining unit 914 may add the output of the error signal generation unit 912 (e.g., $-\hat{h}r_1$) to the signal $r_2$ received from the active receive port 904 to minimize the correlated noise and interference components from the signal $r_2$, as described with reference to Eq. 14. The flow continues at block 1008.

At block 1008, the first network device processes the corrected data signal to yield information originally transmitted from the second network device. For example, the signal processing unit 116 may perform demodulation, decoding, filtering, and other suitable operations to extract the information from the corrected data signal. From block 1008, the flow ends.

It should be understood that the depicted diagrams are examples meant to aid in understanding embodiments and should not be used to limit embodiments or limit scope of the claims. Embodiments may perform additional operations, fewer operations, operations in a different order, operations in parallel, and some operations differently. Although examples describe the transmitting network device including two beamforming units for transmitting independent data signals via two transmit ports to two receiving network devices, embodiments are not so limited. In other embodiments, the transmitting network device may include other suitable number of beamforming units and may be capable of simultaneously transmitting data signals over multiple transmit ports to any suitable number of receiving network devices. The number of receiving network devices to which the transmitting network device may simultaneously transmit independent data signals may be based, at least in part, on the number of transmit ports associated with the transmitting network device. For each receiving network device, the transmitting network device can estimate the beamforming parameters to transmit a data signal to the active receive port of the receiving network device while generating a NULL at active receive ports of the other receiving network devices.

Although FIGS. 1-10 describe null beamforming operations in a 2×2 MIMO PLC system with a 2-port transmitting PLC device and a 2-port receiving PLC device, embodiments are not so limited. In other embodiments, the operations described above may be used in a 2×4 MIMO PLC system or a communication system with another suitable number of transmit ports and receive ports. For example, a 3-port transmitting network device may use the null beamforming operations to transmit a data signal to a first receive port of a 3-port receiving network device and generate a NULL at the second and third receive ports. As another example, three 3-port transmitting network devices may use null beamforming operations to transmit independent data signals to three receive ports of a 3-port receiving network device. As another example, a 3-port transmitting network device may use null beamforming operations to transmit independent data signals to three different receiving network devices.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
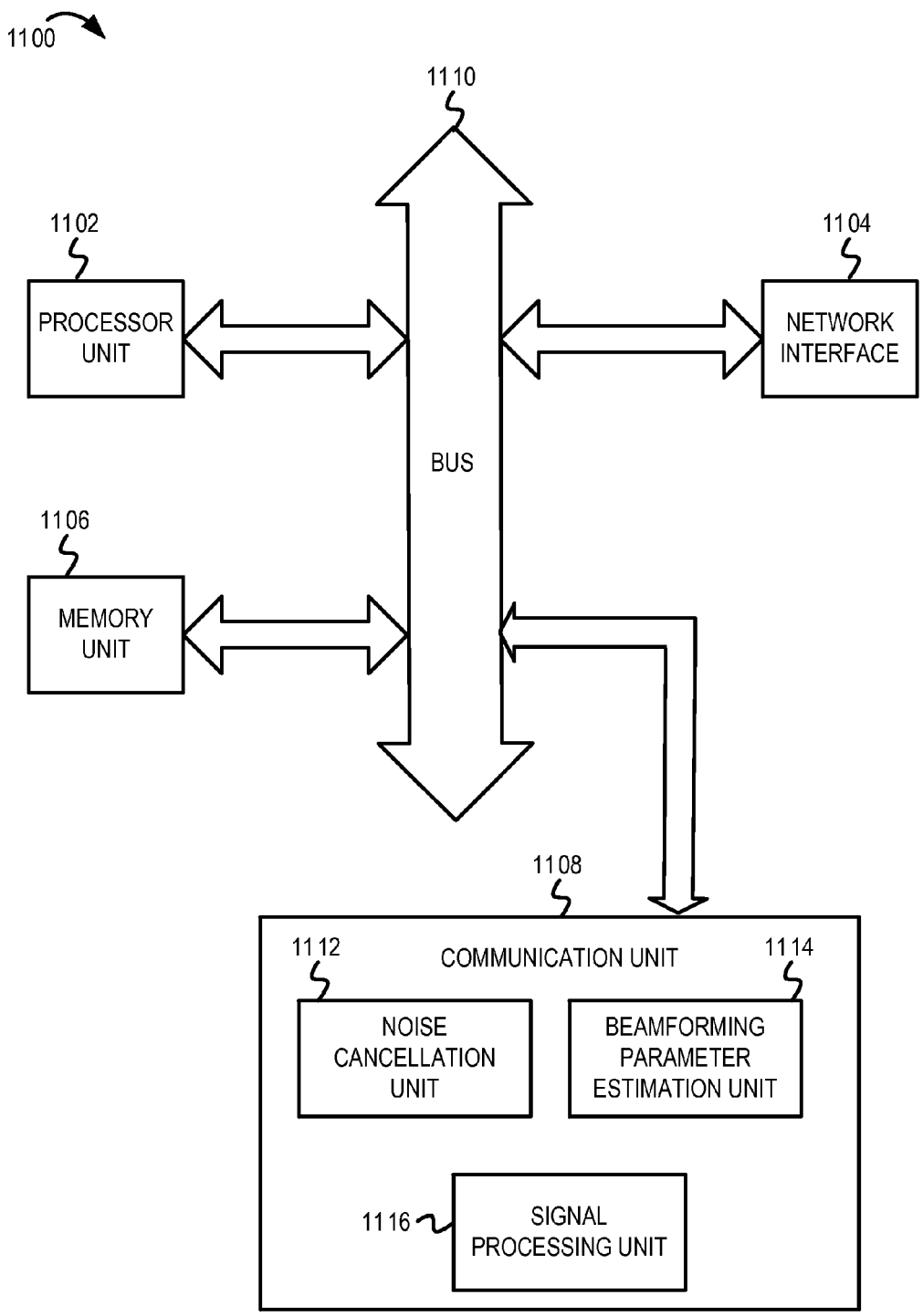
FIG. 11 is a block diagram of one embodiment of an electronic device including a mechanism for null beamforming in a communication network.

FIG. 11 is a block diagram of one embodiment of an electronic device 1100 including a mechanism for null beamforming in a communication network. In some implementations, the electronic device 1100 may be a standalone or dedicated powerline communication (PLC) device connected in a powerline environment. In another embodiment, the electronic device 1100 can be one of a desktop computer, laptop computer, a tablet computer, a smart appliance, a gaming console, a television, a set top box, a media player, or another electronic device comprising powerline communication capabilities or other suitable communication capabilities. The electronic device 1100 includes a processor unit 1102 (possibly including multiple processors, multiple cores, multiple nodes, and/or implementing multi-threading, etc.). The electronic device 1100 includes a memory unit 1106. The memory unit 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable storage media. The electronic device 1100 also includes a bus 1110 (e.g., PCI, ISA, PCI-Express, HyperTransport®, InfiniBand®, NuBus, AHB, AXI, etc.). The electronic device 1100 also includes a network interface 1104 that include a wireless network interface (e.g., a WLAN interface, a Bluetooth® interface, a WiMAX interface, a ZigBee® interface, a Wireless USB interface, etc.) and/or a wired network interface (e.g., a PLC interface, an Ethernet interface, etc.). Furthermore, in some embodiments, the electronic device 1100 can execute an IEEE Std. 1905.1 protocol for implementing hybrid communication functionality.

The electronic device 1100 also includes a communication unit 1108. The communication unit 1108 includes a beamforming parameter estimation unit 1112, a noise cancellation unit 1114, and a signal processing unit 1116. In some embodiments, the beamforming parameter estimation unit 1112 can estimate beamforming parameters for transmitting a data signal (from multiple transmit ports), such that a receiving network device receives the data signal at a first receive port and does not receive the data signal at a second receive port, as described above with reference to FIGS. 2A-2C and 3. In another embodiment, the beamforming parameter estimation unit 1112 can estimate beamforming parameters for transmitting a data signal (from multiple transmit ports), such that a first receiving network device receives the data signal and a second receiving network device does not receive the data signal, as described above with reference to FIGS. 5-7. In another embodiment, the beamforming parameter estimation unit 1112 can estimate the beamforming parameters to simultaneously transmit independent data signals to multiple receiving network devices, as described above with reference to FIGS. 5, 6A, and 6B. In another embodiment, a first network device may have high resource utilization in a shared communication network. In this embodiment, the beamforming parameter estimation unit 1112 may estimate beamforming parameters so that the first network device does not receive the data stream intended for a second network device. In each embodiment, the signal processing unit 1116 may execute operations for generating the data signal to be transmitted, applying the beamforming parameters, processing received signals, etc. In another embodiment, the signal processing unit 1116 can receive independent data signals from multiple transmitting network devices, as described above with reference to FIGS. 4-6B. In another embodiment, the noise cancellation unit 1114 can use the signal sampled at the nulled receive port of the electronic device 1100 for noise and interference cancellation at the active receive port of the electronic device 1100, as described above in FIGS. 9A-10.

Any one of these functionalities may be partially (or entirely) implemented in hardware and/or on the processor unit 1102. For example, the functionality may be implemented with an application specific integrated circuit, in logic implemented in the processor unit 1102, in a co-processor on a peripheral device or card, etc. In some embodiments, the communication unit 1108 can each be implemented on a system-on-a-chip (SoC), an application specific integrated circuit (ASIC), or another suitable integrated circuit to enable communications of the electronic device 1100. In some embodiments, the communication unit 1108 may include additional processors and memory, and may be implemented in one or more integrated circuits on one or more circuit boards of the electronic device 1100. Further, realizations may include fewer or additional components not illustrated in FIG. 11 (e.g., video cards, audio cards, additional network interfaces, peripheral devices, etc.). For example, in addition to the processor unit 1102 coupled with the bus 1110, the communication unit 1108 may include at least one additional processor unit. As another example, although illustrated as being coupled to the bus 1110, the memory unit 1106 may be coupled to the processor unit 1102.

While the embodiments are described with reference to various implementations and exploitations, it will be understood that these embodiments are illustrative and that the scope of the inventive subject matter is not limited to them. In general, techniques for null beamforming in a communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining to transmit a first data signal from a first transmit port and a second transmit port of a first network device to a first receive port of a second network device; and
   determining first beamforming parameters to be used for transmitting the first data signal to the first receive port and for generating a null signal at a second receive port wherein the first data signal is received at the first receive port and not received at the second receive port.

2. The method of claim 1, wherein the first beamforming parameters are a combination of scattering parameters associated with a communication channel between the first network device and the second network device.

3. The method of claim 1, further comprising:
   selecting a beamforming parameter estimation technique for determining the first beamforming parameters based, at least in part, on a processing capability of the second network device.

4. The method of claim 1, further comprising:
   receiving, from the second network device, an indication of a beamforming parameter estimation technique to use for determining the first beamforming parameters at the first network device.

5. The method of claim 1, further comprising:
   receiving, at the first network device, an indication from the second network device to transmit the first data signal to the first receive port.

6. The method of claim 1, wherein the first receive port is configured to implement a first communication protocol and the second receive port is configured to implement a second communication protocol.

7. The method of claim 1, further comprising:
   transmitting the first data signal from the first transmit port and transmitting a derivative of the first data signal from the second transmit port to the first receive port of the second network device, wherein transmitting the first data signal and the derivative of the first data signal is based, at least in part, on the first beamforming parameters.

8. The method of claim 1, wherein said determining the first beamforming parameters at the first network device comprises:
   determining the first beamforming parameters for each of a plurality of communication sub-carriers used by the first network device and the second network device for communication.

9. The method of claim 1, wherein the first network device and the second network device implement powerline communication (PLC) protocols.

10. The method of claim 1, further comprising:
    receiving a second data signal at an active receive port of the first network device from the second network device and receiving a noise signal at a nulled receive port of the first network device;
    generating an error correction signal at the first network device based, at least in part, on the noise signal and a channel parameter associated with the active receive port and the nulled receive port; and
    processing the second data signal using the error correction signal for noise cancellation at the active receive port of the first network device.

11. The method of claim 10, wherein the channel parameter is a ratio of a first signal received at the active receive port and a second signal received at the nulled receive port, wherein the first signal and the second signal are received when the first network device is configured in an idle operating mode.

12. The method of claim 10, further comprising:
    selecting the active receive port for receiving the second data signal from the second network device based, at least in part, on a performance measurement associated with a first receive port and a second receive port of the first network device.

13. The method of claim 1, wherein a third network device comprises the second receive port.

14. The method of claim 13, wherein the second network device is configured to implement a first communication protocol and the third network device is configured to implement a second communication protocol.

15. The method of claim 13, further comprising:
    determining second beamforming parameters at the first network device to be used for:
        transmitting a second data signal from the first transmit port and the second transmit port of the first network device to the second receive port of the third network device; and generating a null signal at the first receive port of the second network device.

16. The method of claim 15, wherein,
said determining the first beamforming parameters is in response to determining to transmit the first data signal using a first communication protocol; and
said determining the second beamforming parameters is in response to determining to transmit the second data signal using a second communication protocol.

17. The method of claim 15, wherein the first beamforming parameters and the second beamforming parameters are a combination of scattering parameters associated with a first communication channel between the first network device and the second network device and a second communication channel between the first network device and the third network device.

18. The method of claim 13, wherein said determining the first beamforming parameters is in response to:
determining that a processing load associated with the third network device exceeds a processing load associated with the second network device.

19. The method of claim 13, further comprising:
determining that the third network device includes the second receive port and a third receive port;
determining a performance measurement associated with the second receive port and the third receive port of the third network device; and
determining to generate the null signal at the second receive port of the third network device based, at least in part, on the performance measurement associated with the second receive port and the third receive port of the third network device.

20. A first network device comprising:
a processor unit; and
a beamforming parameter estimation unit coupled with the processor unit, the beamforming parameter estimation unit configured to:
determine to transmit a first data signal from a first transmit port and a second transmit port of the first network device to a first receive port of a second network device; and
determine first beamforming parameters to be used for transmitting the first data signal to the first receive port and for generating a null signal at a second receive port wherein the first data signal is received at the first receive port and not received at the second receive port.

21. The first network device of claim 20, wherein the beamforming parameter estimation unit is further configured to:
select a beamforming parameter estimation technique for determining the first beamforming parameters based, at least in part, on a processing capability of the second network device, or
receive, from the second network device, an indication of the beamforming parameter estimation technique to use for determining the first beamforming parameters at the first network device.

22. The first network device of claim 20, wherein the first receive port is configured to implement a first communication protocol and the second receive port is configured to implement a second communication protocol.

23. The first network device of claim 20, wherein the beamforming parameter estimation unit configured to determine the first beamforming parameters at the first network device comprises the beamforming parameter estimation unit configured to:
determine the first beamforming parameters for each of a plurality of communication sub-carriers used by the first network device and the second network device for communication.

24. The first network device of claim 20, further comprising a noise cancellation unit configured to:
receive a second data signal at an active receive port of the first network device from the second network device and receive a noise signal at a nulled receive port of the first network device;
generate an error correction signal at the first network device based, at least in part, on the noise signal and a channel parameter associated with the active receive port and the nulled receive port; and
process the second data signal using the error correction signal for noise cancellation at the active receive port of the first network device.

25. The first network device of claim 24, wherein the channel parameter is a ratio of a first signal received at the active receive port and a second signal received at the nulled receive port, wherein the first signal and the second signal are received when the first network device is configured in an idle operating mode.

26. The first network device of claim 20, wherein a third network device comprises the second receive port.

27. The first network device of claim 26, wherein the second network device is configured to implement a first communication protocol and the third network device is configured to implement a second communication protocol.

28. The first network device of claim 26, wherein the beamforming parameter estimation unit is further configured to:
determine second beamforming parameters at the first network device to:
transmit a second data signal from the first transmit port and the second transmit port of the first network device to the second receive port of the third network device; and
generate a null signal at the first receive port of the second network device.

29. The first network device of claim 28, wherein:
the beamforming parameter estimation unit configured to determine the first beamforming parameters is in response to determining to transmit the first data signal using a first communication protocol; and
the beamforming parameter estimation unit configured to determine the second beamforming parameters is in response to determining to transmit the second data signal using a second communication protocol.

30. The first network device of claim 26, wherein the beamforming parameter estimation unit configured to determine the first beamforming parameters is in response to determining that a processing load associated with the third network device exceeds a processing load associated with the second network device.

* * * * *